United States Patent
Nagaoka et al.

(10) Patent No.: US 7,425,280 B2
(45) Date of Patent: Sep. 16, 2008

(54) FERRITE MAGNETIC MATERIAL AND PROCESS FOR PRODUCING THE SAME

(75) Inventors: Junichi Nagaoka, Tokyo (JP); Shigeki Yanagida, Tokyo (JP); Kunio Ohno, Tokyo (JP); Syunsuke Kurasawa, Tokyo (JP); Yoshihiko Minachi, Tokyo (JP)

(73) Assignee: TDK Corporation, Tokyo (JP)

( * ) Notice: Subject to any disclaimer, the term of this patent is extended or adjusted under 35 U.S.C. 154(b) by 330 days.

(21) Appl. No.: 11/261,829

(22) Filed: Oct. 28, 2005

(65) Prior Publication Data
US 2006/0091352 A1 May 4, 2006

(30) Foreign Application Priority Data

Oct. 29, 2004 (JP) .............................. 2004-315197
Oct. 17, 2005 (JP) .............................. 2005-301815

(51) Int. Cl.
*H01F 1/00* (2006.01)
(52) U.S. Cl. .................. 252/62.63; 252/62.57
(58) Field of Classification Search .............. 252/62.57, 252/62.63
See application file for complete search history.

(56) References Cited

U.S. PATENT DOCUMENTS 5,958,284 A * 9/1999 Takami et al. ............. 252/62.63
6,139,766 A 10/2000 Taguchi et al.

FOREIGN PATENT DOCUMENTS

| CN | 1217812 A | 5/1999 |
|---|---|---|
| JP | 11-097226 | 4/1999 |
| JP | 11-154604 | 6/1999 |
| JP | 11-195516 | 7/1999 |
| JP | 2002-175907 | * 6/2002 |
| JP | 2002-175907 A | 6/2002 |
| JP | 2003-151811 | 5/2003 |
| KR | 100359547 | 10/2002 |

OTHER PUBLICATIONS

Translation for JP 2002-175907.*
English translation of Chinese language office action for corresponding Chinese application No. 200510118623.x (the Chinese language office action was filed in a previous IDS on Oct. 24, 2007).

* cited by examiner

*Primary Examiner*—C. Melissa Koslow
(74) *Attorney, Agent, or Firm*—Hogan & Hartson LLP

(57) ABSTRACT

The present invention provides a ferrite magnet material comprising, as a main phase, a ferrite having a hexagonal structure, the main phase containing A, La, R, Fe and Co, wherein A is at least one element selected from Sr, Ba and Pb, R is Pr and/or Nd, and the proportions of the total metal elements A, La, R, Fe and Co in the main phase are respectively A: 1 to 13 atomic %, La: 0.003 to 10 atomic %, R: 0 to 10 atomic % (excluding 0) Fe: 80 to 95 atomic % and Co: 0.05 to 5 atomic % based on the total amounts of metal elements. The residual magnetic flux density Br and coercive force HcJ can be improved without increasing the content of Co by incorporating Pr and/or Nd along with La and Co in the ferrite magnet material.

15 Claims, 44 Drawing Sheets

FIG. 1

| | Sintering Temperature 1180°C | | | Sintering Temperature 1200°C | | |
|---|---|---|---|---|---|---|
| Calcining temperature | Pr (m) | HcJ (Oe) | Br (G) | Hk/HcJ (%) | HcJ (Oe) | Br (G) | Hk/HcJ (%) |
| 1100°C | 0.00 | 4993 | 4220 | 93.6 | 4901 | 4290 | 92.6 |
| | 0.04 | 5030 | 4214 | 93.8 | 4925 | 4298 | 92.5 |
| | 0.08 | 5036 | 4251 | 93.5 | 4935 | 4296 | 92.5 |
| | 0.17 | 5127 | 4232 | 93.5 | 4938 | 4299 | 92.4 |
| | 0.25 | 5152 | 4257 | 92.7 | 4932 | 4296 | 91.2 |
| | 0.33 | 5066 | 4269 | 91.8 | 4963 | 4309 | 91.9 |
| | 0.42 | 5011 | 4254 | 92.0 | 4975 | 4293 | 92.9 |
| | 0.50 | 5073 | 4281 | 88.7 | 5005 | 4312 | 88.7 |
| | 0.67 | 5042 | 4309 | 86.8 | 4926 | 4337 | 85.6 |
| | 0.83 | 5011 | 4302 | 83.6 | 4902 | 4330 | 82.9 |
| | 1.00 | 4896 | 4315 | 79.1 | 4816 | 4345 | 80.5 |
| 1150°C | 0.00 | 4767 | 4269 | 96.0 | 4678 | 4305 | 94.3 |
| | 0.04 | 4780 | 4278 | 96.1 | 4705 | 4309 | 94.1 |
| | 0.08 | 4804 | 4284 | 96.2 | 4710 | 4312 | 94.2 |
| | 0.17 | 4847 | 4269 | 95.9 | 4712 | 4318 | 94.2 |
| | 0.25 | 4853 | 4278 | 93.2 | 4725 | 4309 | 93.7 |
| | 0.33 | 4926 | 4269 | 92.9 | 4767 | 4336 | 93.1 |
| | 0.42 | 4865 | 4278 | 94.1 | 4770 | 4334 | 94.4 |
| | 0.50 | 4877 | 4302 | 91.0 | 4804 | 4336 | 92.4 |
| | 0.67 | 4786 | 4306 | 88.8 | 4700 | 4342 | 89.1 |
| | 0.83 | 4804 | 4312 | 85.8 | 4725 | 4342 | 87.3 |
| | 1.00 | 4847 | 4339 | 79.9 | 4773 | 4354 | 81.2 |

FIG. 5

| Calcining temperature | x/yz | HcJ (Oe) | | Br (G) | |
|---|---|---|---|---|---|
| | | m | | m | |
| | | 0 | 0.33 | 0 | 0.33 |
| 1100°C | 0.8 | 4194 | 4180 | 4325 | 4333 |
| | 1.0 | 4244 | 4321 | 4320 | 4330 |
| | 1.1 | 4294 | 4420 | 4315 | 4328 |
| | 1.2 | 4456 | 4505 | 4315 | 4327 |
| | 1.3 | 4472 | 4584 | 4312 | 4326 |
| | 1.4 | 4540 | 4566 | 4308 | 4315 |
| | 1.5 | 4600 | 4670 | 4296 | 4296 |
| | 1.6 | 4644 | 4682 | 4299 | 4299 |
| | 1.7 | 4640 | 4719 | 4301 | 4309 |
| | 1.9 | 4550 | 4587 | 4319 | 4333 |
| | 2.5 | 3967 | 3988 | 4343 | 4340 |
| 1150°C | 1.2 | - | 4480 | - | 4351 |
| | 1.3 | - | 4584 | - | 4302 |
| | 1.4 | - | 4523 | - | 4302 |
| | 1.5 | - | 4578 | - | 4339 |
| | 1.6 | - | 4590 | - | 4318 |
| | 1.7 | - | 4627 | - | 4336 |

FIG. 8

| Calcining temperature (°C) | Sintering Temperature (°C) | x | y | HcJ (Oe) Pr Not Added | HcJ (Oe) Pr Added | Br (G) Pr Not Added | Br (G) Pr Added | Note: Value of m when Pr is added |
|---|---|---|---|---|---|---|---|---|
| 1150 | 1200 | 0.04 | 0.02 | 4174 | 4324 | 4306 | 4315 | 0.33 |
| 1150 | 1210 | 0.12 | 0.08 | 4600 | 4750 | 4296 | 4302 | 0.33 |
| 1200 | 1210 | 0.24 | 0.16 | 4877 | 4897 | 4367 | 4382 | 0.15 |
| 1200 | 1180 | 0.30 | 0.20 | 5164 | 5182 | 4541 | 4542 | 0.15 |
| 1250 | 1140 | 0.80 | 0.40 | 4115 | 4117 | 4516 | 4515 | 0.05 |

FIG. 9

| z | HcJ (Oe) | | Br (G) | |
|---|---|---|---|---|
| | m | | m | |
| | 0 | 0.33 | 0 | 0.33 |
| 0.90 | 4016 | 3987 | 4352 | 4350 |
| 0.96 | 4487 | 4511 | 4331 | 4336 |
| 0.98 | 4676 | 4780 | 4278 | 4309 |
| 1.00 | 4688 | 4786 | 4296 | 4284 |
| 1.02 | 4285 | 4798 | 4259 | 4281 |
| 1.03 | 4106 | 4316 | 4267 | 4293 |
| 1.05 | 4001 | 4080 | 4267 | 4295 |
| 1.10 | 3474 | 3394 | 4308 | 4310 |

FIG. 12

| mx | Br (G) | | | HcJ (Oe) | | |
|---|---|---|---|---|---|---|
| | x/yz | | | x/yz | | |
| | 1.5 | 1.7 | 1.9 | 1.5 | 1.7 | 1.9 |
| 0.00 | 4220 | 4219 | 4218 | 4474 | 4486 | 4386 |
| 0.02 | 4235 | 4235 | 4229 | 4554 | 4573 | 4498 |
| 0.03 | 4242 | 4231 | 4241 | 4572 | 4578 | 4503 |
| 0.04 | 4241 | 4245 | 4242 | 4601 | 4607 | 4526 |
| 0.05 | 4275 | 4264 | - | 4465 | 4457 | - |

FIG. 15

| Calcining temperature (°C) | Sintering Temperature (°C) | Sr/A (at%) | Ba/A (at%) | HcJ (Oe) | | | Br (G) | | |
|---|---|---|---|---|---|---|---|---|---|
| | | | | 0 | m | 0.33 | 0 | m | 0.33 |
| 1150 | 1210 | 100 | 0 | 4600 | 4750 | | 4296 | 4302 | |
| 1150 | 1210 | 50 | 50 | 4370 | 4410 | | 4285 | 4293 | |

FIG. 16

| Pr (m) | −40°C ~ +120°C ||
|---|---|---|
| | ΔHcJ /HcJ/ΔT (%/°C) | ΔHcJ /ΔT (Oe/°C) |
| 0 | 0.188 | 8.5 |
| 0.08 | 0.186 | 8.5 |
| 0.33 | 0.170 | 8.0 |

| Composition | x | y | z | m | K1 ($\times 10^6 erg/cm^3$) | HcJ at Room Temperature |
|---|---|---|---|---|---|---|
| Pr Not Added | 0.12 | 0.08 | 1.00 | 0 | 2.93 | 4603 |
| Pr Added | 0.12 | 0.08 | 1.00 | 0.33 | 3.01 | 4831 |

FIG. 20

| Ca/Si | m | Additive amount of CaCO₃ (wt%) | Additive amount of SiO₂ (wt%) | Br(G) | HcJ(Oe) |
|---|---|---|---|---|---|
| 0.70 | 0.00 | 0.18 | 0.15 | 4039 | 2548 |
| | 0.33 | | | 4038 | 2565 |
| | 0.00 | 0.35 | 0.30 | 4195 | 4004 |
| | 0.33 | | | 4202 | 4051 |
| | 0.00 | 0.70 | 0.60 | 4142 | 4113 |
| | 0.33 | | | 4145 | 4183 |
| | 0.00 | 1.05 | 0.90 | 4157 | 4055 |
| | 0.33 | | | 4156 | 4105 |
| | 0.00 | 1.40 | 1.35 | 4152 | 3451 |
| | 0.33 | | | 4162 | 3486 |
| 1.40 | 0.00 | 0.35 | 0.15 | 4107 | 2955 |
| | 0.33 | | | 4115 | 2960 |
| | 0.00 | 0.70 | 0.30 | 4325 | 4451 |
| | 0.33 | | | 4332 | 4491 |
| | 0.00 | 1.40 | 0.60 | 4296 | 4600 |
| | 0.33 | | | 4302 | 4750 |
| | 0.00 | 2.10 | 0.90 | 4289 | 4532 |
| | 0.33 | | | 4298 | 4602 |
| | 0.00 | 2.45 | 1.05 | 4241 | 4204 |
| | 0.33 | | | 4240 | 4305 |
| | 0.00 | 3.15 | 1.35 | 4238 | 3076 |
| | 0.33 | | | 4235 | 3152 |
| 1.75 | 0.00 | 0.45 | 0.15 | 4218 | 2513 |
| | 0.33 | | | 4221 | 2535 |
| | 0.00 | 0.88 | 0.30 | 4400 | 4102 |
| | 0.33 | | | 4410 | 4146 |
| | 0.00 | 1.75 | 0.60 | 4306 | 4331 |
| | 0.33 | | | 4306 | 4402 |
| | 0.00 | 2.63 | 0.90 | 4236 | 4615 |
| | 0.33 | | | 4236 | 4662 |
| | 0.00 | 3.94 | 1.35 | 4110 | 4530 |
| | 0.33 | | | 4122 | 4552 |

FIG. 27

| Additive amount of $SiO_2$ (wt%) | m | Additive amount of $CaCO_3$ (wt%) | Ca/Si | Br(G) | HcJ(Oe) |
|---|---|---|---|---|---|
| 0.30 | 0.00 | 0.17 | 0.35 | 3470 | 2518 |
|  | 0.33 |  |  | 3472 | 2523 |
|  | 0.00 | 0.35 | 0.70 | 4195 | 4004 |
|  | 0.33 |  |  | 4196 | 4053 |
|  | 0.00 | 0.70 | 1.40 | 4325 | 4451 |
|  | 0.33 |  |  | 4335 | 4600 |
|  | 0.00 | 0.88 | 1.75 | 4400 | 4102 |
|  | 0.33 |  |  | 4406 | 4223 |
|  | 0.00 | 1.05 | 2.10 | 4396 | 2667 |
|  | 0.33 |  |  | 4405 | 2680 |
| 0.60 | 0.00 | 0.35 | 0.35 | 3250 | 4249 |
|  | 0.33 |  |  | 3248 | 4261 |
|  | 0.00 | 0.70 | 0.70 | 4142 | 4113 |
|  | 0.33 |  |  | 4145 | 4153 |
|  | 0.00 | 1.05 | 1.05 | 4265 | 4237 |
|  | 0.33 |  |  | 4266 | 4300 |
|  | 0.00 | 1.40 | 1.40 | 4296 | 4600 |
|  | 0.33 |  |  | 4302 | 4750 |
|  | 0.00 | 1.75 | 1.75 | 4306 | 4331 |
|  | 0.33 |  |  | 4311 | 4403 |
|  | 0.00 | 2.10 | 2.10 | 4355 | 1228 |
|  | 0.33 |  |  | 4354 | 1236 |
| 0.90 | 0.00 | 0.53 | 0.35 | 3758 | 4154 |
|  | 0.33 |  |  | 3760 | 4159 |
|  | 0.00 | 1.05 | 0.70 | 4157 | 4055 |
|  | 0.33 |  |  | 4155 | 4175 |
|  | 0.00 | 2.10 | 1.40 | 4289 | 4532 |
|  | 0.33 |  |  | 4298 | 4635 |
|  | 0.00 | 2.63 | 1.75 | 4236 | 4615 |
|  | 0.33 |  |  | 4233 | 4758 |
|  | 0.00 | 3.15 | 2.10 | 4292 | 3991 |
|  | 0.33 |  |  | 4299 | 4010 |

FIG. 34

| Timing for Addition | Pr m | Br (G) | HcJ (Oe) | Calcining temperature (°C) |
|---|---|---|---|---|
| Pre-addition | 0 | 4203 | 4649 | 1100 |
| | | 4253 | 4415 | 1150 |
| Pre-addition | 0.33 | 4217 | 4771 | 1100 |
| | | 4269 | 4553 | 1150 |
| Post-addition | 0 | 4167 | 4795 | 1100 |
| | | 4202 | 4645 | 1150 |
| Post-addition | 0.33 | 4197 | 4694 | 1100 |
| | | 4245 | 4544 | 1150 |

FIG. 36

| R | Calcining temperature (°C) | m (Nd) | HcJ (Oe) | Br (G) |
|---|---|---|---|---|
| Nd | 1150°C | 0.00 | 4731 | 4302 |
| | | 0.08 | 4737 | 4315 |
| | | 0.25 | 4780 | 4293 |
| | | 0.42 | 4816 | 4278 |
| | | 0.58 | 4535 | 4315 |

FIG. 39

| | m | Fe | Mn | Sr | Ba | Si | Ca | La | Pr | Co | Al | Cr |
|---|---|---|---|---|---|---|---|---|---|---|---|---|
| Example 1 | 0.00 | 89.76 | 0.27 | 6.62 | 0.02 | 0.64 | 1.00 | 0.90 | 0.00 | 0.60 | 0.08 | 0.09 |
| | 0.04 | 89.81 | 0.26 | 6.62 | 0.02 | 0.64 | 0.99 | 0.87 | 0.04 | 0.59 | 0.07 | 0.08 |
| | 0.08 | 89.76 | 0.27 | 6.63 | 0.03 | 0.63 | 1.00 | 0.83 | 0.07 | 0.60 | 0.08 | 0.09 |
| | 0.17 | 89.77 | 0.27 | 6.63 | 0.03 | 0.63 | 1.00 | 0.75 | 0.15 | 0.59 | 0.08 | 0.09 |
| | 0.25 | 89.80 | 0.26 | 6.63 | 0.02 | 0.62 | 1.00 | 0.68 | 0.23 | 0.59 | 0.08 | 0.08 |
| | 0.33 | 89.84 | 0.26 | 6.62 | 0.02 | 0.64 | 1.00 | 0.61 | 0.30 | 0.60 | 0.04 | 0.07 |
| | 0.42 | 89.76 | 0.27 | 6.63 | 0.02 | 0.64 | 1.00 | 0.52 | 0.38 | 0.60 | 0.08 | 0.09 |
| | 0.50 | 89.76 | 0.26 | 6.64 | 0.02 | 0.64 | 1.00 | 0.45 | 0.45 | 0.60 | 0.09 | 0.09 |
| | 0.67 | 89.80 | 0.27 | 6.63 | 0.01 | 0.62 | 1.00 | 0.30 | 0.60 | 0.60 | 0.08 | 0.07 |
| | 0.83 | 89.78 | 0.27 | 6.62 | 0.02 | 0.64 | 1.00 | 0.15 | 0.75 | 0.60 | 0.07 | 0.08 |
| | 0.67 | 89.80 | 0.27 | 6.63 | 0.01 | 0.62 | 1.00 | 0.30 | 0.60 | 0.60 | 0.08 | 0.07 |
| | 0.83 | 89.78 | 0.27 | 6.62 | 0.02 | 0.64 | 1.00 | 0.15 | 0.75 | 0.60 | 0.07 | 0.08 |
| | 1.00 | 89.76 | 0.27 | 6.63 | 0.02 | 0.64 | 1.00 | 0.00 | 0.90 | 0.60 | 0.08 | 0.09 |

FIG. 40

| | x/yz | Fe | Mn | Sr | Ba | Si | Ca | La | Pr | Co | Al | Cr |
|---|---|---|---|---|---|---|---|---|---|---|---|---|
| Example 2<br>m=0 | 0.8 | 89.78 | 0.27 | 7.05 | 0.01 | 0.64 | 1.00 | 0.48 | 0.00 | 0.60 | 0.07 | 0.09 |
| | 1.0 | 89.79 | 0.26 | 6.93 | 0.02 | 0.65 | 1.00 | 0.60 | 0.00 | 0.59 | 0.07 | 0.09 |
| | 1.1 | 89.77 | 0.28 | 6.87 | 0.01 | 0.65 | 1.00 | 0.66 | 0.00 | 0.60 | 0.07 | 0.08 |
| | 1.2 | 89.78 | 0.27 | 6.81 | 0.01 | 0.65 | 1.01 | 0.72 | 0.00 | 0.61 | 0.07 | 0.07 |
| | 1.3 | 89.82 | 0.25 | 6.75 | 0.01 | 0.64 | 1.00 | 0.78 | 0.00 | 0.59 | 0.08 | 0.08 |
| | 1.4 | 89.80 | 0.27 | 6.69 | 0.01 | 0.64 | 1.01 | 0.84 | 0.00 | 0.60 | 0.06 | 0.09 |
| | 1.5 | 89.78 | 0.26 | 6.63 | 0.02 | 0.65 | 1.00 | 0.90 | 0.00 | 0.59 | 0.07 | 0.08 |
| | 1.6 | 89.84 | 0.26 | 6.57 | 0.01 | 0.63 | 1.00 | 0.96 | 0.00 | 0.59 | 0.08 | 0.07 |
| | 1.7 | 89.80 | 0.27 | 6.51 | 0.01 | 0.64 | 1.00 | 1.02 | 0.00 | 0.60 | 0.07 | 0.08 |
| | 1.9 | 89.77 | 0.27 | 6.39 | 0.01 | 0.64 | 1.00 | 1.14 | 0.00 | 0.61 | 0.08 | 0.09 |
| | 2.5 | 89.75 | 0.27 | 6.02 | 0.02 | 0.64 | 1.01 | 1.51 | 0.00 | 0.60 | 0.08 | 0.09 |
| Example 2<br>m=0.33 | 0.8 | 89.78 | 0.28 | 7.05 | 0.02 | 0.64 | 1.01 | 0.32 | 0.16 | 0.59 | 0.06 | 0.08 |
| | 1.0 | 89.79 | 0.27 | 6.93 | 0.01 | 0.64 | 1.01 | 0.40 | 0.20 | 0.61 | 0.07 | 0.07 |
| | 1.1 | 89.79 | 0.25 | 6.87 | 0.02 | 0.65 | 1.01 | 0.44 | 0.22 | 0.61 | 0.06 | 0.08 |
| | 1.2 | 89.79 | 0.27 | 6.81 | 0.01 | 0.64 | 1.00 | 0.48 | 0.24 | 0.60 | 0.08 | 0.09 |
| | 1.3 | 89.80 | 0.26 | 6.75 | 0.02 | 0.65 | 1.00 | 0.52 | 0.26 | 0.59 | 0.05 | 0.09 |
| | 1.4 | 89.78 | 0.27 | 6.69 | 0.01 | 0.65 | 1.01 | 0.57 | 0.28 | 0.60 | 0.07 | 0.08 |
| | 1.5 | 89.79 | 0.26 | 6.63 | 0.02 | 0.65 | 1.00 | 0.61 | 0.30 | 0.60 | 0.07 | 0.08 |
| | 1.6 | 89.80 | 0.27 | 6.57 | 0.02 | 0.64 | 1.01 | 0.65 | 0.32 | 0.59 | 0.07 | 0.07 |
| | 1.7 | 89.78 | 0.27 | 6.51 | 0.01 | 0.64 | 1.00 | 0.69 | 0.34 | 0.61 | 0.08 | 0.08 |
| | 1.9 | 89.75 | 0.27 | 6.38 | 0.02 | 0.65 | 1.00 | 0.77 | 0.38 | 0.60 | 0.08 | 0.09 |
| | 2.5 | 89.77 | 0.27 | 6.02 | 0.01 | 0.63 | 1.01 | 1.01 | 0.50 | 0.60 | 0.08 | 0.09 |

FIG. 41

| | z | Fe | Mn | Sr | Ba | Si | Ca | La | Pr | Co | Al | Cr |
|---|---|---|---|---|---|---|---|---|---|---|---|---|
| Example 4 m=0 | 0.90 | 88.77 | 0.29 | 7.29 | 0.01 | 0.71 | 1.09 | 0.99 | 0.00 | 0.66 | 0.08 | 0.09 |
| | 0.96 | 89.42 | 0.28 | 6.88 | 0.02 | 0.65 | 1.04 | 0.94 | 0.00 | 0.62 | 0.07 | 0.09 |
| | 0.98 | 89.64 | 0.26 | 6.73 | 0.01 | 0.65 | 1.03 | 0.92 | 0.00 | 0.62 | 0.08 | 0.07 |
| | 1.00 | 89.80 | 0.27 | 6.63 | 0.01 | 0.64 | 1.00 | 0.90 | 0.00 | 0.59 | 0.07 | 0.08 |
| | 1.02 | 89.91 | 0.26 | 6.53 | 0.01 | 0.64 | 1.00 | 0.89 | 0.00 | 0.59 | 0.08 | 0.09 |
| | 1.03 | 90.12 | 0.25 | 6.44 | 0.01 | 0.61 | 0.98 | 0.88 | 0.00 | 0.59 | 0.06 | 0.07 |
| | 1.05 | 90.21 | 0.25 | 6.34 | 0.02 | 0.61 | 0.97 | 0.86 | 0.00 | 0.58 | 0.07 | 0.09 |
| | 1.10 | 90.64 | 0.23 | 6.08 | 0.01 | 0.59 | 0.92 | 0.83 | 0.00 | 0.55 | 0.07 | 0.08 |
| Example 4 m=0.33 | 0.90 | 88.77 | 0.29 | 7.29 | 0.02 | 0.71 | 1.10 | 0.67 | 0.33 | 0.65 | 0.08 | 0.09 |
| | 0.96 | 89.44 | 0.28 | 6.88 | 0.01 | 0.66 | 1.03 | 0.63 | 0.31 | 0.62 | 0.07 | 0.07 |
| | 0.98 | 89.62 | 0.28 | 6.73 | 0.01 | 0.65 | 1.01 | 0.61 | 0.30 | 0.61 | 0.08 | 0.08 |
| | 1.00 | 89.80 | 0.26 | 6.63 | 0.01 | 0.64 | 1.00 | 0.61 | 0.30 | 0.61 | 0.06 | 0.09 |
| | 1.02 | 89.95 | 0.25 | 6.53 | 0.01 | 0.62 | 1.00 | 0.60 | 0.29 | 0.60 | 0.07 | 0.07 |
| | 1.03 | 90.06 | 0.24 | 6.43 | 0.03 | 0.64 | 0.97 | 0.59 | 0.29 | 0.58 | 0.07 | 0.09 |
| | 1.05 | 90.20 | 0.25 | 6.34 | 0.02 | 0.61 | 0.97 | 0.58 | 0.29 | 0.58 | 0.08 | 0.09 |
| | 1.10 | 90.67 | 0.26 | 6.03 | 0.03 | 0.58 | 0.91 | 0.55 | 0.27 | 0.54 | 0.07 | 0.08 |

FIG. 42

| | m | Fe | Mn | Sr | Ba | Si | Ca | La | Nd | Co | Al | Cr |
|---|---|---|---|---|---|---|---|---|---|---|---|---|
| Example 12 R=Nd | 0.00 | 89.81 | 0.27 | 6.62 | 0.02 | 0.63 | 1.00 | 0.90 | 0.00 | 0.59 | 0.08 | 0.08 |
| | 0.08 | 89.84 | 0.26 | 6.63 | 0.03 | 0.62 | 0.99 | 0.83 | 0.07 | 0.59 | 0.07 | 0.07 |
| | 0.25 | 89.84 | 0.26 | 6.60 | 0.02 | 0.63 | 1.00 | 0.68 | 0.23 | 0.60 | 0.08 | 0.08 |
| | 0.42 | 89.79 | 0.27 | 6.63 | 0.01 | 0.64 | 1.00 | 0.52 | 0.38 | 0.59 | 0.08 | 0.08 |
| | 0.58 | 89.81 | 0.27 | 6.59 | 0.02 | 0.64 | 1.00 | 0.38 | 0.52 | 0.60 | 0.08 | 0.08 |

FIG. 43

| Timing for Adding La, Pr Components | Timing for Adding Co Component | Si component | | Ca component | | Calcining temperature (°C) | Sintering Temperature (°C) | Br (G) | HcJ (Oe) |
|---|---|---|---|---|---|---|---|---|---|
| | | Timing for Addition | Total amount (wt%) | Timing for Addition | Total amount (wt%) | | | | |
| Pre-addition | Post-addition | 100%-Post | 0.60 | 100%-Post | 1.40 | 1200 | 1200 | 4221 | 4753 |
| | | 50%-Pre 50%-Post | | | | 1150 | 1200 | 4265 | 4872 |
| | | 80%-Pre 20%-Post | | | | 1150 | 1210 | 4286 | 4804 |
| | | 100%-Pre | | | | 1150 | 1210 | 4302 | 4750 |

FERRITE MAGNETIC MATERIAL AND PROCESS FOR PRODUCING THE SAME

BACKGROUND OF THE INVENTION

1. Field of the Invention

The present invention relates to an oxide magnetic material, particularly an M type ferrite magnet material containing R and Co.

2. Description of the Related Art

Generally, as an oxide permanent magnet material, magnetoplumbite type (M type) Sr ferrite or Ba ferrite of a hexagonal system is mainly used. These M type ferrites have been used as sintered magnets and bonded magnets, because the ferrites are relatively inexpensive and have high magnetic properties, and the ferrites are utilized, for example, in motors equipped in home electronics, cars, etc.

In recent years, electronic parts have been increasingly demanded to be downsized and exhibit high performance and, accordingly, a ferrite sintered magnet have also been strongly demanded to be downsized and exhibit high performance. For example, a ferrite sintered magnet with a high residual magnetic flux density and a high coercive force which cannot been attained by conventional M type ferrite sintered magnets is proposed in Japanese Patent Laid-Open No. 11-154604 (Patent Document 1). This ferrite sintered magnet contains Sr, La and Co at least, and has a hexagonal M type ferrite as a main component. Another hexagonal M type ferrite containing Sr, Pr and Co, or Sr, Nd and Co is disclosed in Japanese Patent Laid-Open No. 11-97226 (Patent Document 2) and Japanese Patent Laid-Open No. 11-195516 (Patent Document 3).

[Patent Document 1]
Japanese Patent Laid-Open No. 11-154604
[Patent Document 2]
Japanese Patent Laid-Open No. 11-97226
[Patent Document 3]
Japanese Patent Laid-Open No. 11-195516

However, these ferrite magnets have still been demanded to have improved coercive force and saturation magnetization. In addition, although these ferrite magnets have improved coercive force (HcJ) and residual magnetic flux density (Br) by incorporating Co therein, ferrite magnets are more expensive than before, since Co is expensive.

Accordingly, an object of the present invention is to provide a technology effective for improving the residual magnetic flux density (Br) and/or coercive force (HcJ) of a ferrite sintered magnet without increasing the content of Co.

SUMMARY OF THE INVENTION

The present inventors have conducted studies on the improvement in magnetic properties of a hexagonal M type ferrite sintered magnet and consequently found that it is effective to incorporate Pr and/or Nd in a hexagonal M type ferrite in which a part of the main component is substituted with La and Co. That is, the present invention provides a ferrite magnetic material comprising, as a main phase, a ferrite having a hexagonal structure, the main phase containing A, La, R, Fe and Co, wherein A is at least one element selected from Sr, Ba and Pb, R is Pr and/or Nd, and the proportions of the total metal elements A, La, R, Fe and Co in the main phase are respectively A: 1 to 13 atomic %, La: 0.003 to 10 atomic %, R: 0 to 10 atomic % (excluding 0), Fe: 80 to 95 atomic % and Co: 0.05 to 5 atomic % based on the total amounts of metal elements.

When replacement with La and Co is performed in an M type ferrite, it is effective to further incorporate Pr and/or Nd in addition to La therein, and it is preferable to comprise, as a main component, a composition represented by the composition formula: $A_{1-x}(La_{1-m}R_m)_x(Fe_{12-y}Co_y)_zO_{19}$ wherein A is at least one element selected from Sr, Ba and Pb; R is Pr and/or Nd; and $0.04 \leq x < 0.80$;
$0.02 \leq y < 0.40$;
$0.00 < m < 0.90$; and
$0.90 < z < 1.10$.

Further in the present invention, x/yz preferably satisfies $1.0 < x/yz < 2.5$ in the above-mentioned composition formula. The effect of improving magnetic properties becomes remarkable by doing so.

Furthermore, in the present invention, a Si component can be contained in an amount of 0.15 to 1.35 wt % in terms of $SiO_2$ based on the above-mentioned main component, and a Ca component can be contained therein to allow Ca/Si, a molar ratio of the Ca component to the Si component, to be in the range of 0.35 to 2.10.

The ferrite magnetic material of the present invention can be used as a ferrite sintered magnet. This ferrite sintered magnet can be obtained by sintering the powder material after subjecting them to predetermined treatment. The ferrite magnetic material of the present invention can be also used in the form of ferrite magnet particles. The ferrite magnet particles are typically used as magnetic particles for a bonded magnet. Furthermore, the ferrite magnetic material of the present invention can be used as a magnetic film of a magnetic recording medium. These application forms are mentioned as typical examples and the ferrite magnetic material of the present invention can be applicable to any other applications.

The ferrite magnetic material of the present invention may also contain a Si component as an additive. Examples of the Si component include $SiO_2$. The Si component is preferably added before the calcination step, more specifically in the mixing step. The magnetic properties can be improved by adding 40% or more of the total amount of the Si component before the calcination step while replacing a part of La with Pr and/or Nd.

According to the present invention, the magnetic properties of ferrite magnetic material can be improved by replacing a part of La with Pr and/or Nd. Specifically, the material can have a coercive force (HcJ) of 4000 Oe or more and a residual magnetic flux density (Br) of 4000 G or more. Furthermore, the material can also have a coercive force (HcJ) of 4500 Oe or more and a residual magnetic flux density (Br) of 4200 G or more.

Since the magnetic properties can be improved, high magnetic properties can be obtained even if the content of expensive Co is reduced.

BRIEF DESCRIPTION OF THE DRAWINGS

FIG. 1 is a table which shows the relation between m and the magnetic properties in Example 1;

FIG. 5 is a table which shows the relation between x/yz and the magnetic properties in Example 2;

FIG. 8 is a table which shows the relation between x, y and m, and the magnetic properties in Example 3;

FIG. 9 is a table which shows the relation between z and the magnetic properties in Example 4;

FIG. 12 is a table which shows the relation between x/yz and mx, and the magnetic properties in Example 5;

FIG. 15 is a table which shows the magnetic properties when using Ba as an element A in Example 6;

FIG. 16 is a table which shows the temperature coefficient of coercive force (HcJ) determined in Example 7;

FIG. 20 is a table which shows the relation between the additive amount of $SiO_2$ and the magnetic properties in Example 9;

FIG. 27 is a table which shows the relation between Ca/Si and the magnetic properties in Example 10;

FIG. 34 is a table which shows the magnetic properties in the case where Pr and La are pre-added and the magnetic properties in the case where Pr and La are post-added;

FIG. 36 is a table which shows the magnetic properties in the case where Nd was added as an element R;

FIG. 39 is a table which shows the analysis value (atomic %) of the sintered body produced in the Example 1;

FIG. 40 is a table which shows the analysis value (atomic %) of the sintered body produced in the Example 2;

FIG. 41 is a table which shows the analysis value (atomic %) of the sintered body produced in the Example 4;

FIG. 42 is a table which shows the analysis value (atomic %) of the sintered body produced in the Example 12;

FIG. 43 is a table which shows the relation between the addition timing of Si component ($SiO_2$) and the magnetic properties in Example 13;

DETAILED DESCRIPTION OF THE PREFERRED EMBODIMENTS

Figure 2:
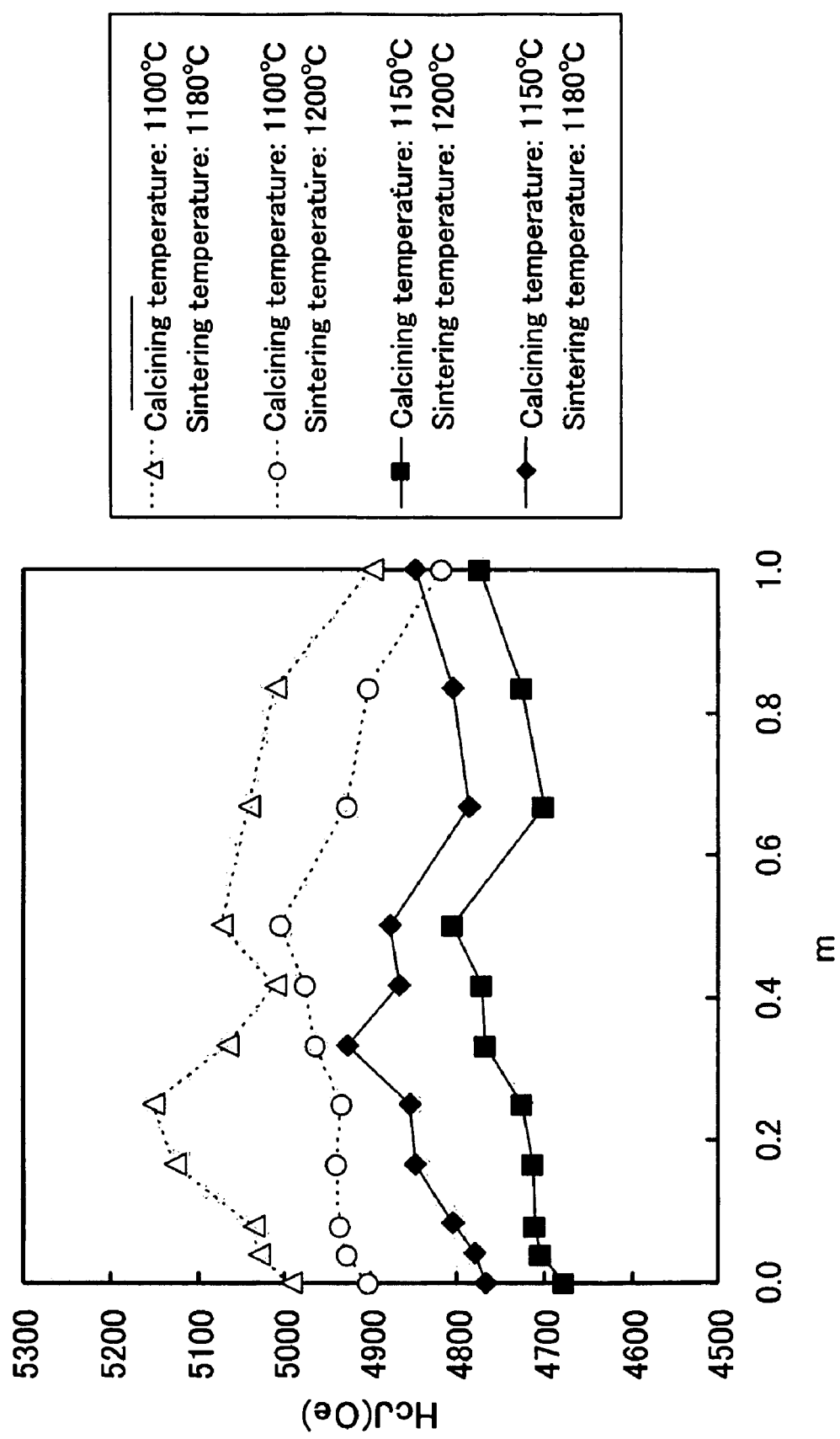
FIG. 2 is a graph which shows the relation between m and the coercive force (HcJ) in Example 1.

The ferrite magnetic material of the present invention is explained in detail hereinafter.

The ferrite magnetic material of the present invention comprises as the main phase a ferrite having a hexagonal structure, and the proportions of the total metal elements of A, La, R, Fe and Co in the main phase are respectively A: 1 to 13 atomic %;
La: 0.003 to 10 atomic %;
R: 0 to 10 atomic % (excluding 0);
Fe: 80 to 95 atomic %; and
Co: 0.05 to 5 atomic % to the total amounts of metal elements.

Here, A is at least one element selected from Sr, Ba and Pb and R is Pr and/or Nd.

If A is too small, M type ferrite will not be generated or nonmagnetic phase such as $\alpha\text{-}Fe_2O_3$ will increase. If A is too large, M type ferrite will not be generated or nonmagnetic phase such as $SrFeO_{3-x}$ will increase. Therefore, A is included in an amount of 1 to 13 atomic % in the present invention. The preferable range of A is 3 to 11 atomic % and more preferably 3 to 9 atomic %.

The ratio of Sr in A is preferably 50 atomic % or more, more preferably 70 atomic % or more and still more preferably 100 atomic %. When the ratio of Sr in A is too low, it is impossible to improve saturation magnetization and remarkably improve coercive force at the same time.

R is Pr and/or Nd, and of these, it is more preferable to essentially comprise Pr for the improvement in the magnetic properties.

When R exceeds O, the magnetic properties will be improved, but if R exceeds 10 atomic %, squareness (Hk/

HcJ), which is one of the indices of the magnetic properties, deteriorates, and it becomes difficult to obtain a practical magnet. Therefore, R is contained in an amount of 0 to 10 atomic % (excluding 0) in the present invention.

The range of R is preferably 0.005 to 5.4 atomic % and more preferably 0.01 to 3.6 atomic %.

If the content of La is too small, it will become impossible to secure a predetermined amount of Co solid-soluted in the hexagonal M type ferrite, and the saturation magnetization and/or the anisotropy field will not sufficiently improved. Conversely, if the amount of La is too large, presence of excessive La which cannot be substituted and form a solid solution in the hexagonal M type ferrite may generate hetero phases such as an ortho-ferrite containing, for example, the element R, which deteriorates magnetic properties.

Therefore, La is contained in an amount of 0.003 to 10 atomic % in the present invention. The preferable range of La is 0.05 to 6.0 atomic %, more preferably 0.5 to 4.0 atomic %.

If the content of Co is too small, the saturation magnetization and/or the anisotropy field will not sufficiently improved. However, if the amount of Co is too large, excessive Co which cannot be substituted and form a solid solution in the hexagonal M type ferrite will be resulted. Therefore, Co is contained in an amount of 0.05 to 5 atomic % in the present invention. The preferable range of Co is 0.1 to 4.0 atomic %, more preferably 0.15 to 3.0 atomic %.

If the content of Fe is too small, M type ferrite will not be generated or nonmagnetic phase such as $SrFeO_{3-x}$ will increase. However, if the amount of Fe is too large, M type ferrite will not be generated or nonmagnetic phase such as $\alpha\text{-}Fe_2O_3$ will increase. Therefore, Fe is contained in an amount of 80 to 95 atomic % in the present invention. The preferable range of Fe is 83 to 94 atomic % and more preferably 86 to 93 atomic %.

Particularly preferably the ferrite magnetic material of the present invention comprises as the main component a compound represented by the composition formula:

$$A_{1-x}(La_{1-m}R_m)_x(Fe_{12-y}Co_y)_zO_{19}$$

wherein A is at least one selected from Sr, Ba and Pb; R is Pr and/or Nd; and $0.04 \leq x < 0.80$;
$0.02 \leq y < 0.40$;
$0.00 < m < 0.90$, and
$0.90 < z < 1.10$.

The reasons for limitation of the above-mentioned composition formula are explained hereinafter.

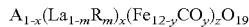

If x is too small in the above-mentioned formula $A_{1-x}(La_{1-m}R_m)_x(Fe_{12-y}Co_y)_zO_{19}$, i.e., if the content of $(La_{1-m}R_m)$ is too small, it will become impossible to secure a predetermined amount of Co solid-soluted in the hexagonal M type ferrite, and the saturation magnetization and/or the anisotropy field will not sufficiently improved. Conversely, if x is too large, presence of excessive $(La_{1-m}R_m)$ which cannot be substituted and form a solid solution in the hexagonal M type ferrite may generate hetero phases such as an ortho-ferrite containing, for example, an element R, which deteriorates magnetic properties. Therefore, x should satisfy $0.04 \leq x < 0.80$ in the present invention. The preferable value of x is $0.04 \leq x \leq 0.45$, more preferably $0.05 \leq x \leq 0.30$, still more preferably $0.05 \leq x \leq 0.25$.

R (m):

Here, R is Pr and/or Nd, and of these, it is more preferable to essentially comprise Pr for the improvement in the magnetic properties.

If m exceeds 0, the magnetic properties will be improved, but if m becomes 0.90 or more, the squareness (Hk/HcJ) which is one of the indices of the magnetic properties will deteriorate, and it will become difficult to obtain a practical magnet. Therefore, m should satisfy $0.00 < m < 0.90$ in the present invention. The preferable value of m is $0.01 \leq m \leq 0.70$ and more preferable value of m is $0.04 \leq m \leq 0.60$.

A:

A is at least one elements selected from Sr, Ba and Pb. Among these, it is most preferable to use Sr from a viewpoint of the improvement in coercive force (HcJ).

Co (y):

If y, which represents the amount of Co, is too small, the saturation magnetization and/or the anisotropy field will not be sufficiently improved. However, if y is too large, presence of excessive Co which cannot be substituted and form a solid solution in the hexagonal M type ferrite maybe resulted. In addition, even if Co falls within the range to allow substitution and formation of a solid solution, degradation of magnetocrystalline anisotropy constant ($K_1$) or anisotropy field (Ha) becomes large. Therefore, y should satisfy $0.02 \leq y < 0.40$ in the present invention. The preferable value of y is $0.02 \leq y \leq 0.30$, more preferably $0.04 \leq y \leq 0.20$, still more preferably $0.06 \leq y \leq 0.20$.

z:

If z is too small in the composition formula $A_{1-x}(La_{1-m}R_m)_x(Fe_{12-y}Co_y)_zO_{19}$ hetero phases containing Sr or the element R will increase, and if z is too large, hetero phases such as spinel ferrite phase containing $\alpha\text{-}Fe_2O_3$ or the element M will increase, and the magnetic properties will be degraded. Therefore, z preferably satisfies $0.90 < z < 1.10$ in the present invention. The preferable value of z is $0.96 \leq z \leq 1.05$ and still more preferable value of z is $0.97 \leq z \leq 1.04$.

x/yz:

In the ferrite magnetic material of the present invention, x/yz which shows the ratio of the total amount of La and R to the amount of Co preferably satisfies $1.0 \leq x/yz < 2.5$. It was conventionally considered that this ratio was ideally 1 as disclosed in the Patent Documents 1 to 3 mentioned above. However, since the magnetic properties will be improved when it exceeds 1.1 as apparent from the Examples described below, x/yz preferably satisfies $1.1 \leq x/yz \leq 2.3$, more preferably $1.3 \leq x/yz \leq 2.0$.

Although the number of oxygen atoms O is 19 in the composition formula of the present invention, this shows the stoichiometric composition ratio of oxygen when all Co are divalent, all La and R are trivalent, and x=y and z=1. The number of oxygen atoms varies depending on the values of x, y and z. In addition, when the sintering atmosphere is a reductive atmosphere, for example, deficit (vacancy) of oxygen may be resulted. Furthermore, although Fe usually exists as trivalent in M type ferrite, this may change to divalent, etc. Further, the valence of Co may change, La and R Co may also take a valence number other than three, and the ratio of the oxygen to metal elements varies with these changes. Although the number of oxygen atoms is indicated as 19 regardless of the values of x, y and z in this specification, the actual number of oxygen atoms may be a value somewhat deviated from this.

Although the composition of the ferrite magnetic material according to the present invention can be measured by X-ray fluorescence spectrometry, etc., the measurement does not exclude the presence of constituents other than the main components and additives. The existence of the above-mentioned main phase can be confirmed by X ray diffraction, electron diffraction, etc.

The ferrite magnetic material according to the present invention may contain Si component and Ca component as additives. Si component and Ca component are added for the purpose of the improvement of sinterability of hexagonal M type ferrite, control of the magnetic properties, and the adjustment of grain size of the sintered body, etc.

Although it is preferable to use $SiO_2$ as a Si component and $CaCO_3$ as a Ca component respectively, they are not limited to these examples and compounds which can attain the effect of the present invention can be used suitably. The additive amount is preferably 0.15 to 1.35 wt % in terms of $SiO_2$ as for the Si component and Ca/Si, the molar ratio of the Ca component to the Si component is in the range of 0.35 to 2.10, more preferably 0.30 to 0.90 wt % in terms of $SiO_2$ and Ca/Si of 0.70 to 1.75, still more preferably 0.45 to 0.90 wt % and Ca/Si of 1.05 to 1.75.

The ferrite magnetic material of the present invention may contain $Al_2O_3$ and/or $Cr_2O_3$ as additives. Although $Al_2O_3$ and $Cr_2O_3$ improve coercive force, they reduce residual magnetic flux density. The sum total content of $Al_2O_3$ and $Cr_2O_3$ are preferably below 3 wt % in order to suppress the decrease in the residual magnetic flux density. In addition, in order to fully demonstrate the effect of adding $Al_2O_3$ and/or $Cr_2O_3$, the total content of $Al_2O_3$ and $Cr_2O_3$ is preferably 0.1 wt % or more.

The ferrite magnetic material of the present invention may contain $B_2O_3$ as additives. Since calcining temperature and sintering temperature can be lowered by incorporating $B_2O_3$, it is advantageous in the production. The content of $B_2O_3$ is preferably 0.5 wt % or less based on the whole ferrite magnetic material. If the $B_2O_3$ content is too large, saturation magnetization will become lower.

Although it is preferable that alkali metals such as Na, K and Rb are not contained in the ferrite magnetic material of the present invention, these maybe contained as impurities. The sum total of these contents are preferably 3 wt % or less based on the whole ferrite sintered body when the contents are calculated by converting them into oxides such as $Na_2O$, $K_2O$ and $Rb_2O$. If the contents thereof are too large, saturation magnetization will become lower.

Besides the above, for example, Ga, Mg, Cu, Mn, Ni, Zn, In, Li, Ti, Zr, Ge, Sn, V, Nb, Ta, Sb, As, W, Mo, etc., may be contained as an oxide. These contents are preferably, as converted into the oxide of stoichiometric composition, 5 wt % or less for gallium oxide, 5 wt % or less for magnesium oxide, 5 wt % or less for copper oxide, 5 wt % or less for manganese oxide, 5 wt % or less for nickel oxide, 5 wt % or less for zinc oxide, 3 wt % or less for indium oxide, 1 wt % or less for lithium oxide, 3 wt % or less for titanium oxide, 3 wt % or less for zirconium oxide, 3 wt % or less for germanium oxide, 3 wt % or less for tin oxide, 3 wt % or less for vanadium oxide, 3 wt % or less for niobium oxide, 3 wt % or less for tantalum oxide, 3 wt % or less for antimony oxide, 3 wt % or less for arsenic oxide, 3 wt % or less for tungsten oxide, and 3 wt % or less for molybdenum oxide, respectively.

When the ferrite magnetic material of the present invention is in the form of a ferrite sintered body, the mean grain size thereof is preferably 1.5 μm or less, more preferably 1.0 μm or less, still more preferably 0.5 to 1.0 μm. The grain size can be measured with a scanning electron microscope.

When the ferrite magnetic material of the present invention is in the form of ferrite particles, even if the mean particle size of the primary particle exceeds 1 μm, higher coercive force can be obtained compared with conventional ferrite particles. Preferably, the mean particle size of a primary particle is 2 μm or less, more preferably 1 μm or less, and still more preferably 0.1 to 1 μm. If the mean particle size is too large, the ratio of the multi-domain particle in ferrite particles will become higher, coercive force will become lower, and when the mean particle size is too small, magnetism will decrease in accordance with heat turbulence, and orientation and moldability at the time of compacting in a magnetic field will be degraded.

Ferrite particles are usually used for a bonded magnet by combining them with a binder. As a binder, nitrile rubber (NBR rubber), chlorinated polyethylene, nylon 12 (polyamide resin), nylon 6 (polyamide resin), etc. are usually used.

Next, preferable production process of the ferrite magnetic material of the present invention is described.

The production process of ferrite particles is explained first.

As the production process of ferrite particles, various kinds of methods such as solid reaction method, liquid phase method such as coprecipitation method and hydrothermal synthesis method, glass depositing method, spray pyrolysis, and a gaseous phase method, can be used. Among these, solid reaction method is industrially carried out most commonly as the production process of the ferrite particles for bonded magnets at present.

In the solid reaction method, production is performed by using powders containing Fe, elements A and La, elements R and Co, Si and Ca as materials and sintering (calcinating) the mixture of these powders. The primary particles of ferrite in this calcined body aggregate and form so-called "granule" state. Therefore, they are subsequently milled in many cases. Milling is performed in dry or wet condition but since distortion is introduced into ferrite particles on this occasion and magnetic properties (mainly coercive force) deteriorates, annealing treatment is performed after milling in many cases.

Calcination may be performed in the air, for example, 1000 to 1350° C. for 1 second to 10 hours, particularly for about 1 second to about 3 hours. The thus obtained calcined body has substantially magnetoplumbite type ferrite structure, mean particle size of the primary particle is preferably 2 μm or less, more preferably 1 μm or less, still more preferably 0.1 to 1 μm and most preferably 0.1 to 0.5 μm. The mean particle size can be measured with a scanning electron microscope.

Subsequently, the calcined body is usually milled or pulverized to form powders of ferrite particles. In the case of using these ferrite particles as a bonded magnet, they are mixed with various a binder such as resin, metal and rubber, and compacted in a magnetic field or in a non-magnetic field. Then, if needed, they are cured to form a bonded magnet.

Next, the ferrite sintered body is explained.

The ferrite sintered body is produced by compacting and sintering the ferrite particles prepared by various kinds of methods stated above in the production process of ferrite particle.

Since the calcined body obtained by calcination of powder material is generally in granules, it is preferable to perform dry condition pulverizing first in order to perform milling or disintegration of these. Most of impurities contained in materials and added Si and Ca are segregated on the grain boundaries or the triple points but a part of them are taken into the ferrite portion (main phase) in a grain. Particularly Ca has a high possibility of slipping into the Sr sites.

It is preferable to prepare slurry for milling containing ferrite particles and water after dry condition pulverizing, and to perform wet milling using this.

After wet milling, the slurry for milling is concentrated and slurry for compacting is prepared. Concentration can be performed by centrifugal separation, filter pressing, etc.

Although the compacting may be performed in dry condition or wet condition, it is preferable to perform wet compacting in order to make the degree of orientation high.

At the wet compacting step, compacting in a magnetic field is performed using the slurry for compacting. Compacting pressure may be set to about 0.1 to about 0.5 ton/cm² and applied magnetic field may be set to about 5 to about 15 kOe.

The compacted body is heat-treated at a temperature of 100 to 500° C. in the atmosphere or nitrogen after the wet compacting step, and the added dispersant is fully decomposed and removed. Subsequently, at a sintering step, the compacted body is sintered preferably at a temperature of 1150 to 1270° C., more preferably 1160 to 1240° C. for example in the atmosphere for about 0.5 to 3 hours, and an anisotropic ferrite sintered body is obtained.

In the above production process, the timing for adding La and/or R is not particularly limited and they can be added at a suitable timing where appropriate, but preferably they are added at the time of mixing the materials. In the present invention, pre-addition is defined as addition at the time of mixing the materials and post-addition is defined as addition at the time of milling the calcined powers, and hereinafter, the same as defined here.

The timing for adding Co is not particularly limited and it can be added at a suitable timing where appropriate, but preferably it is post-added.

The timing for adding Si is not particularly limited and it can be added at a suitable timing where appropriate, but preferably 40% or more of the total amount is pre-added. More preferable amount of pre-addition is 50% or more of the total amount, still more preferably 80% or more, and it is more preferable to pre-add the total amount.

The timing for adding Ca is not particularly limited and it can be added at a suitable timing where appropriate, but preferably 50% or more of the total amount is post-added, and it is more preferable to post-add the total amount.

Next, sputtering method is usually preferable for the formation of a thin film magnetic layer. When the sputtering method is used, the above-mentioned sintered magnet may be used as a target, and multitarget sputtering method using at least two kinds of oxide targets may be used. Heat-treating may be performed in order to form a hexagonal magnetoplumbite structure after forming the sputtered film.

EXAMPLE 1

Iron oxide ($Fe_2O_3$), strontium carbonate ($SrCO_3$), praseodymium oxide ($Pr_6O_{11}$), and lanthanum hydroxide (La$(OH)_3$) were prepared as starting materials. After weighing these starting materials of which the main components were composed so that the main components after sintering may be in the following composition formula, silicon oxide ($SiO_2$) was added in an amount of 0.6 wt % to the main components.

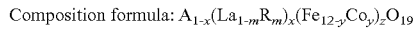

Composition formula: $A_{1-x}(La_{1-m}R_m)_x(Fe_{12-y}Co_y)_zO_{19}$ wherein
A=Sr, R=Pr;
x=0.12, y=0.08, z=1.00 m=0 to 1.0; and
x/yz=1.5.

These mixed materials were mixed and milled in a wet attritor for 2 hours. After the obtained mixed slurry was dried, calcination was performed in the atmosphere for 2.5 hours. The calcining temperature was 1100° C. or 1150° C.

The obtained calcined powders were pulverized for 10 minutes by a small rod vibration mill. After weighing and adding cobalt oxide ($Co_3O_4$) to the obtained pulverized powders so that it may become the main composition after the above-mentioned calcination, calcium carbonate ($CaCO_3$) and sorbitol were added so that the former might be 1.4 wt % and the latter might be 0.9 wt % to the main composition after the above-mentioned sintering, and they were milled in a wet ball mill for 25 hours.

The solid part concentration of the obtained milled slurry was adjusted to 70 to 75%, a cylindrically compacted body with diameter of 30 mm×thickness of 15 mm was obtained in a magnetic field of 12 kOe applied using a wet-magnetic field molding machine. The compacted body was fully dried at room temperature in the atmosphere, and subsequently sintered in the atmosphere for 1 hour. The sintering temperature was 1180° C. or 1200° C.

After processing the top and bottom sides of the obtained cylindrical sintered body, coercive force (HcJ), residual magnetic flux density (Br) and squareness (Hk/HcJ) were measured using a B—H tracer having maximum application magnetic field of 25 kOe. Here, Hk is the external magnetic field intensity when the magnetic flux density is 90% of the residual magnetic flux density in the second quadrant of the magnetic hysteresis loop. The results are shown in FIG. 1 to FIG. 4.

Figure 3:
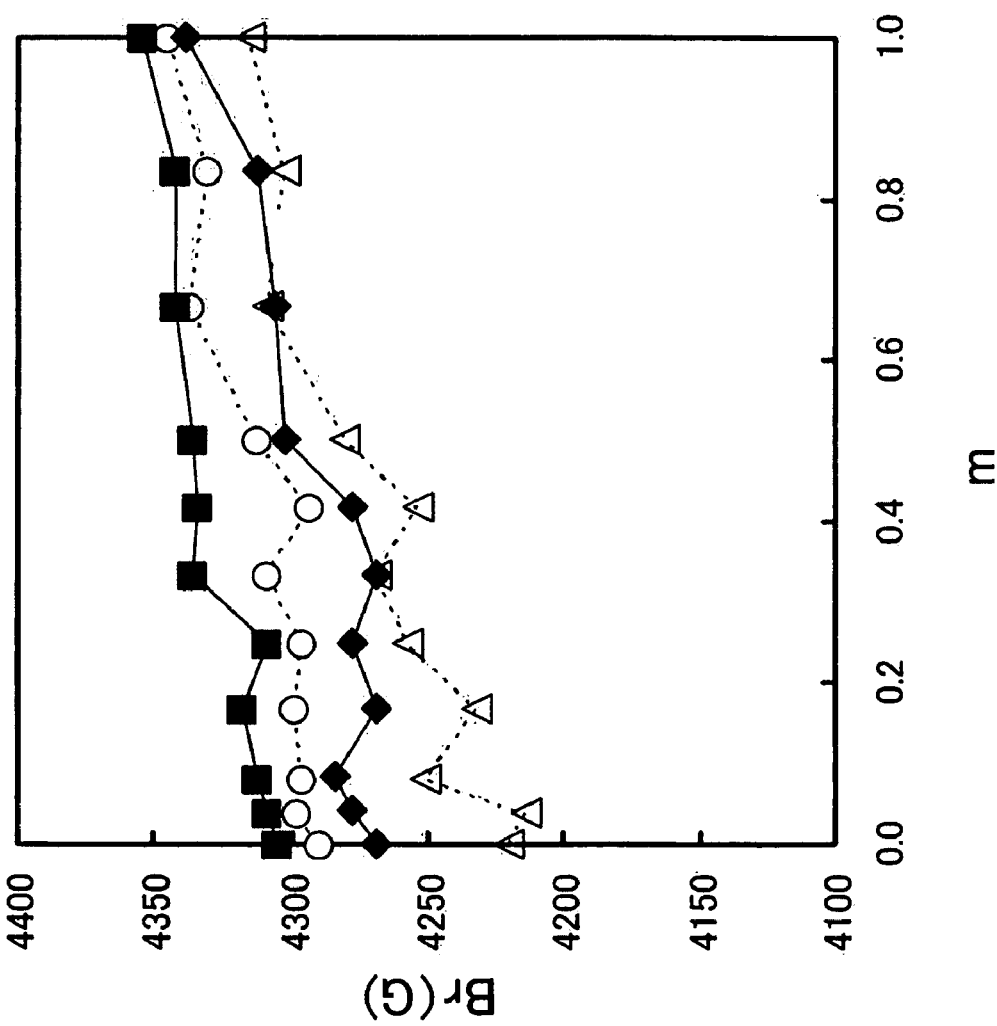
FIG. 3 is a graph which shows the relation between m and the residual magnetic flux density (Br) in Example 1.
Figure 4:
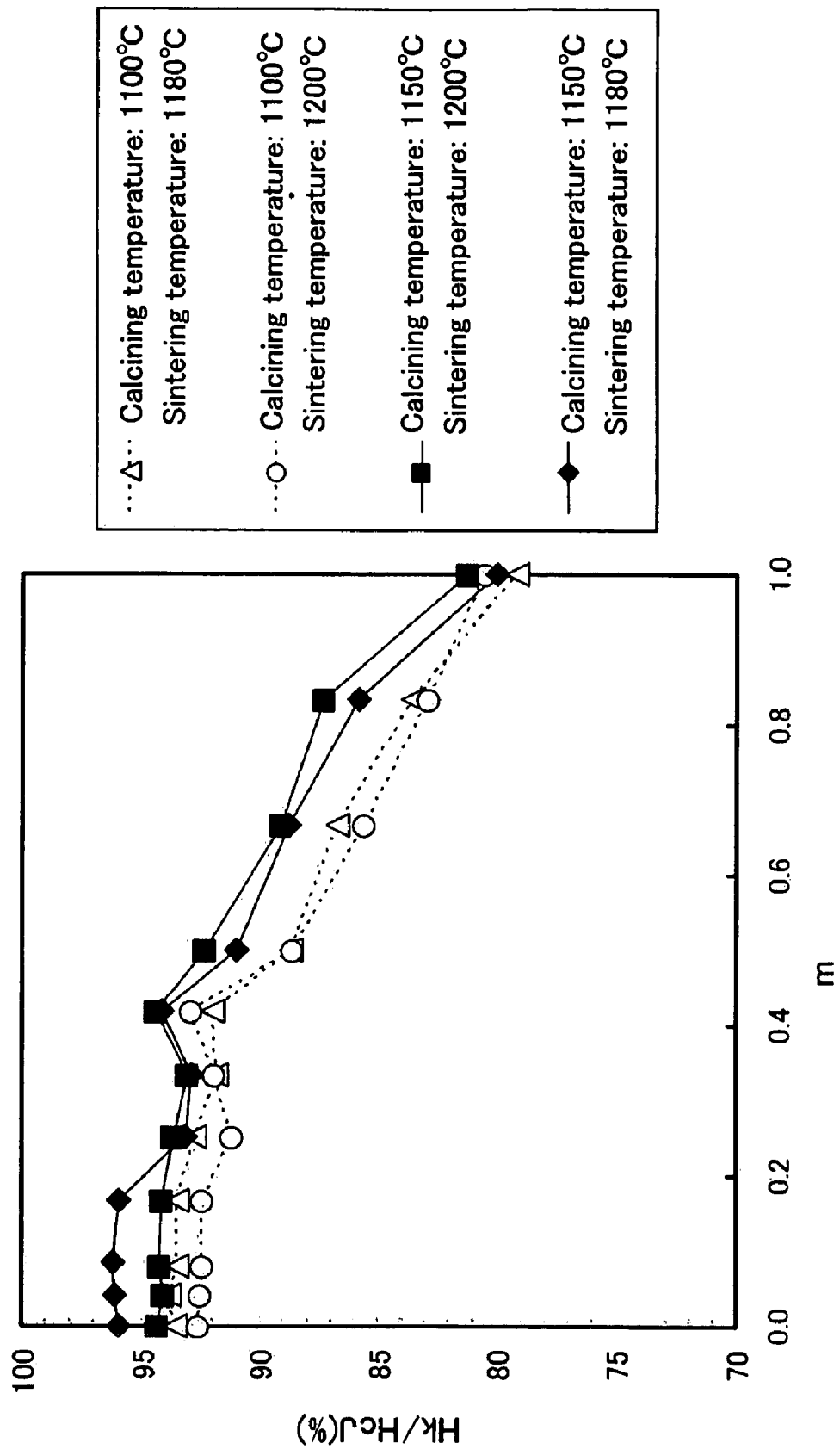
FIG. 4 is a graph which shows the relation between m and the squareness (Hk/HcJ) in Example 1.

As shown in FIGS. 2 and 3, the resulted residual magnetic flux density (Br) and coercive force (HcJ) also changed as the conditions of calcination and sintering were changed but residual magnetic flux density (Br) and coercive force (HcJ) were able to be improved by adjusting m to 0.0<m in each of the four cases shown in FIGS. 2 and 3. However, if m becomes 0.9 or more as shown in FIG. 4, squareness (Hk/HcJ) decreases to nearly 80%. If the squareness (Hk/HcJ) in the demagnetization curve becomes low there arises a problem that (BH) max becomes low and change with the passage of time becomes large, and a practical magnet cannot be obtained. Therefore, m should satisfy 0.0<m<0.9.

It has been confirmed that 0.01≦m≦0.70 is preferable, more preferably 0.04≦m≦0.60 in order to obtain high residual magnetic flux density (Br) and high coercive force (HcJ) while controlling the decrease of squareness (Hk/HcJ).

EXAMPLE 2

The preferable range of x/yz was confirmed in Example 2.

Except for having weighed so that the main composition after sintering might be the following composition formula, a cylindrical sintered body was produced on the same conditions as in Example 1, and coercive force (HcJ) and residual magnetic flux density (Br) were measured in the same way as in Example 1. The results are shown in FIG. 5 to FIG. 7.

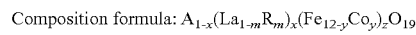

Composition formula: $A_{1-x}(La_{1-m}R_m)_x(Fe_{12-y}Co_y)_zO_{19}$ wherein
A=Sr, R=Pr;
y=0.08, z=1.00 m=0 and 0.33;
mx=0.04 when m=0.33, and
x/yz=0.8 to 2.5.

Figure 6:
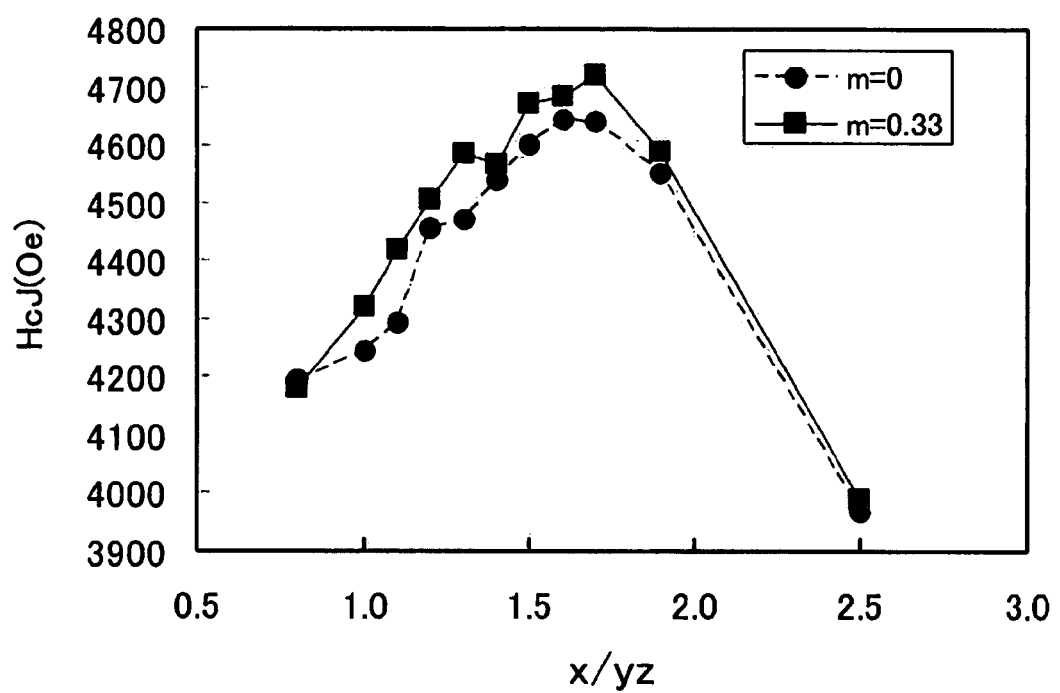
FIG. 6 is a graph which shows the relation between x/yz and the coercive force (HcJ) in Example 2.
Figure 7:
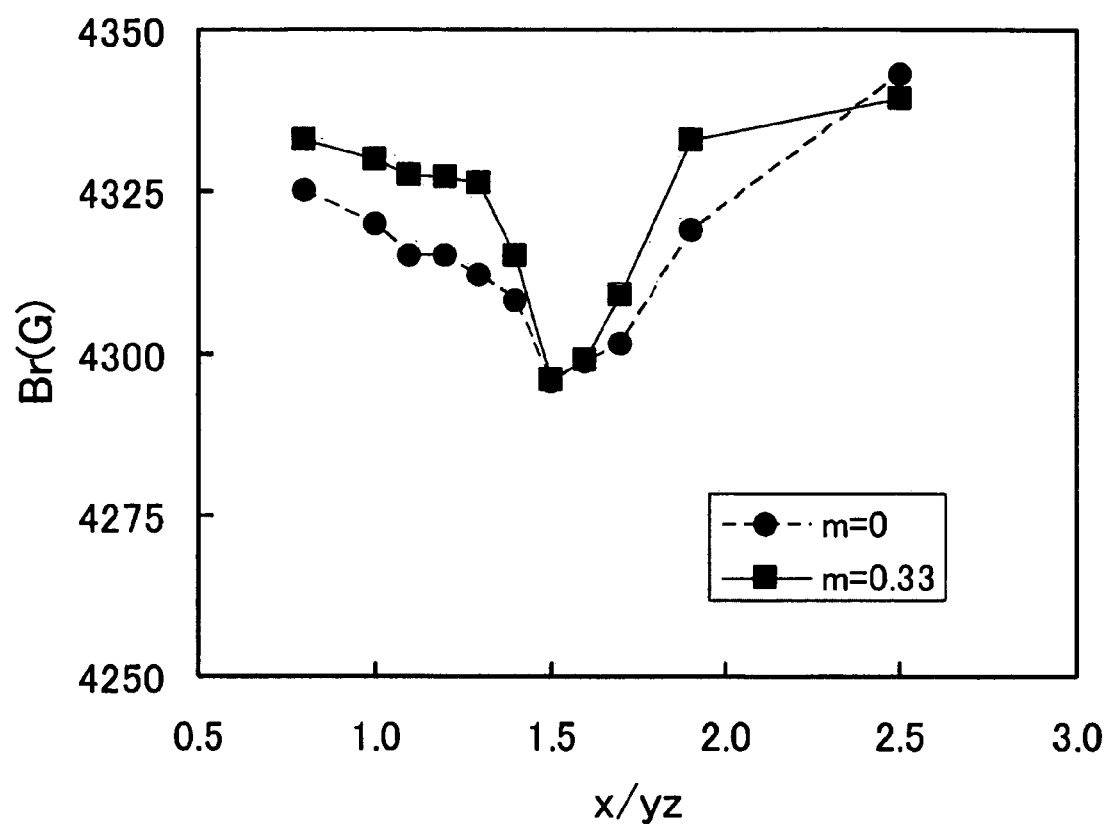
FIG. 7 is a graph which shows the relation between x/yz and the residual magnetic flux density (Br) in Example 2.

As shown in FIG. 6 and FIG. 7, in the range of 1.0<x/yz<2.5, higher coercive force (HcJ) and residual magnetic flux density (Br) were obtained by containing Pr than the case where m=0, i.e., Pr was not contained. When the coercive force (HcJ) is considered as more important, the range of 1.1≦x/yz≦2.3 is preferable, more preferably 1.2≦x/yz≦1.8. On the other hand, when the residual magnetic flux density (Br) is considered as more important, a range of 1.0<x/yz≦1.4 and a range of 1.9≦x/yz<2.5 are preferable.

EXAMPLE 3

The relation between x, y and m, and the magnetic properties was confirmed in Example 3.

Except for having weighed so that the main composition after sintering might be the following composition formula, a cylindrical sintered body was produced on the same conditions as in Example 1, and coercive force (HcJ) and residual magnetic flux density (Br) were measured in the same way as in Example 1. The results are shown in FIG. 8.

Composition formula: $A_{1-x}(La_{1-m}R_m)_x(Fe_{12-y}Co_y)_zO_{19}$ wherein
A=Sr, R=Pr;
x=0.04 to 0.80, y=0.02 to 0.40;
z=1.00, m=0.00 to 0.33.

As shown in FIG. 8, if x=0.80 or y=0.40, the effect of the improvement in the magnetic properties by containing Pr content is saturated. Therefore, the maximum of x and y is set to x<0.8 and y<0.4, respectively.

Preferably, x satisfies $0.04 \leq x \leq 0.45$, more preferably $0.05 \leq x \leq 0.30$. Preferably, y satisfies $0.02 \leq y \leq 0.30$, more preferably $0.05 \leq y \leq 0.20$.

When y=0.02 and y=0.08, i.e. in the case where amount of Co was small, the improvement effect in the magnetic properties by containing Pr was remarkable.

EXAMPLE 4

The preferable range of z was confirmed in Example 4.

Figure 10:
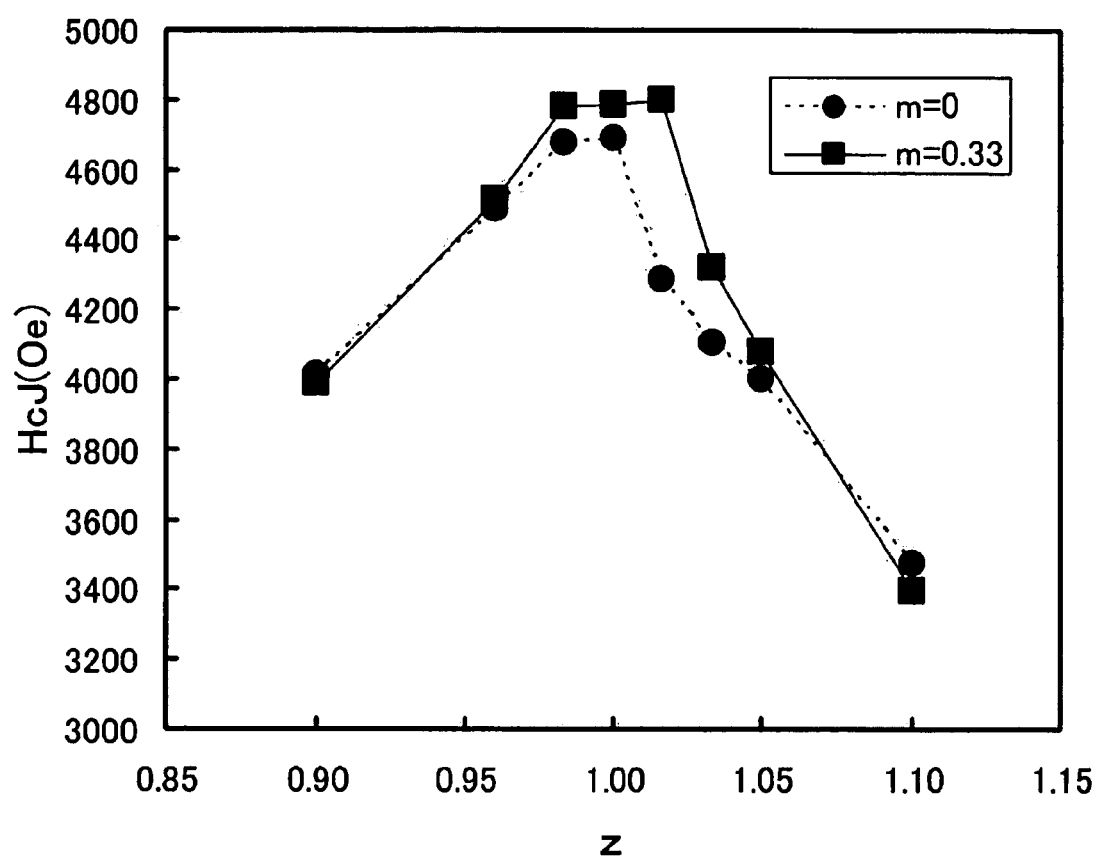
FIG. 10 is a graph which shows the relation between z and the coercive force (HcJ) in Example 4.
Figure 11:
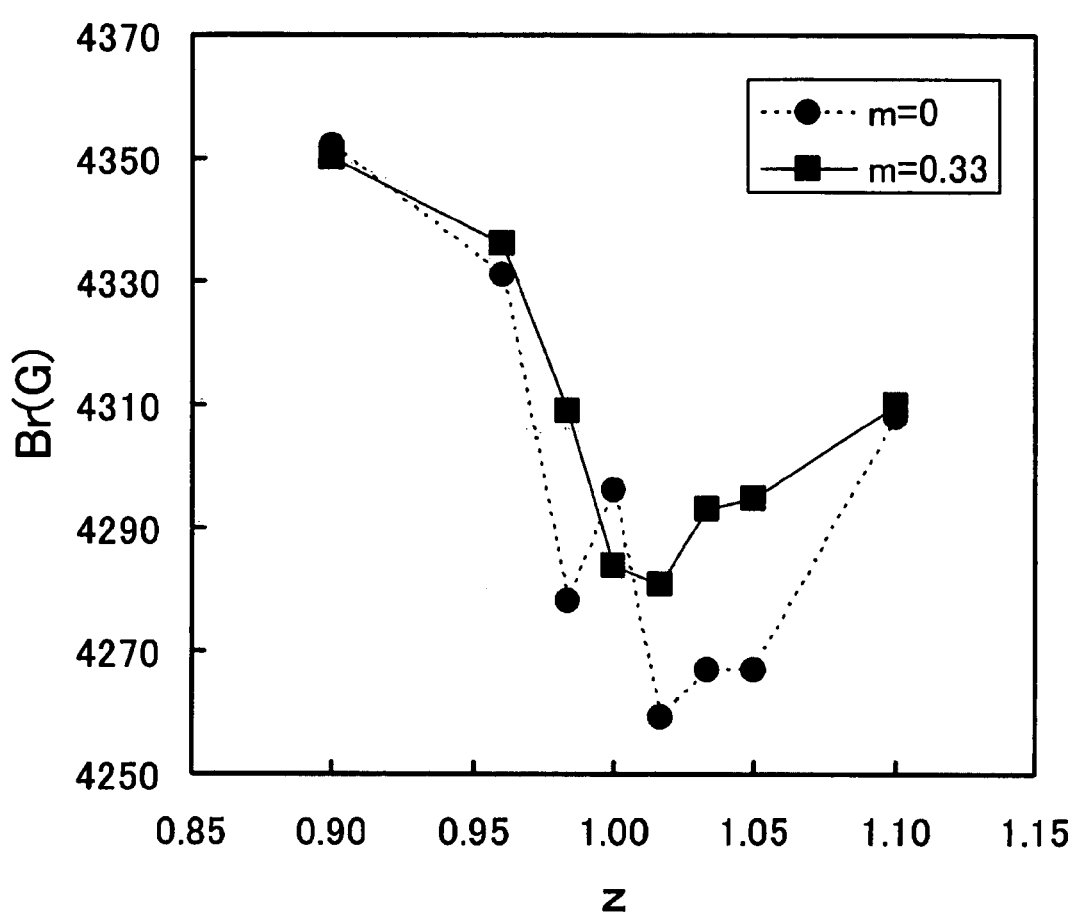
FIG. 11 is a graph which shows the relation between z and the residual magnetic flux density (Br) in Example 4.

Except for having weighed so that the main composition after sintering might be the following composition formula, a cylindrical sintered body was produced on the same conditions as in Example 1, and coercive force (HcJ) and residual magnetic flux density (Br) were measured in the same way as in Example 1. The results are shown in FIG. 9 to FIG. 11. Here, the calcining temperature was 1150° C. and the sintering temperature was 1200° C.

Composition formula: $A_{1-x}(La_{1-m}R_m)_x(Fe_{12-y}Co_y)_zO_{19}$ wherein
A=Sr, R=Pr;
x=0.12, and z=0.90 to 1.10; and
yz=0.08 m=0 and 0.33.

As shown in FIG. 10, higher coercive force (HcJ) was obtained by containing Pr in the range of 0.90<z<1.10 than the case where Pr was not contained.

As shown in FIG. 9, coercive force (HcJ) of 4000 Oe or more and the residual magnetic flux density beyond 4270 G (Br) was able to be obtained in the range of $0.92 \leq z \leq 1.05$ in the case of m=0.33, and coercive force (HcJ) of 4200 Oe or more and the residual magnetic flux density (Br) beyond 4270 G was able to be obtained in the range of $0.95 \leq z \leq 1.04$.

EXAMPLE 5

Changes of the magnetic properties when x/yz and mx were varied were confirmed in Example 5.

After weighing the starting materials used in Example 1 so that the main components after sintering may be following composition formula, silicon oxide ($SiO_2$) was added in an amount of 0.6 wt % to the main components. These mixed materials were mixed and milled in a wet attritor for 2 hours. After the obtained mixed slurry was dried, calcination was performed at 1150° C. in the atmosphere for 2 hours.

The obtained calcined powders were pulverized for 17 minutes by a small rod vibration mill. After weighing and adding cobalt oxide ($Co_3O_4$) to the obtained pulverized powders so that it may become the main composition after the above-mentioned sintering, calcium carbonate ($CaCO_3$) and sorbitol were added so that the former might be 1.4 wt % and the latter might be 0.5 wt % to the main composition after the above-mentioned sintering, and they were milled in a wet attritor for 2 hours.

Composition formula: $A_{1-x}(La_{1-m}R_m)_x(Fe_{12-y}Co_y)_zO_{19}$ wherein
A=Sr, R=Pr;
mx=0 to 0.05, z=1.00;
y=0.08; and
Ca/Si=1.4

Except for the above points, a cylindrical sintered body was produced on the same conditions as in Example 1, and coercive force (HcJ) and residual magnetic flux density (Br) were measured in the same way as in Example 1. The results are shown in FIG. 12 to FIG. 14.

Figure 13:
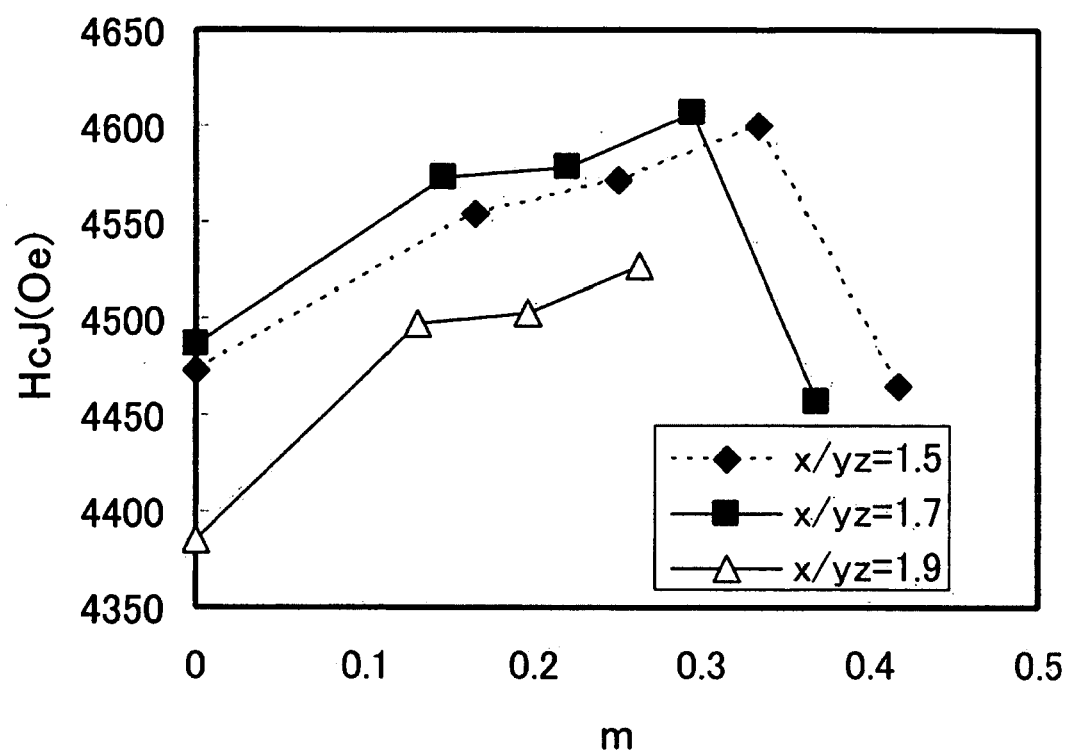
FIG. 13 is a graph which shows the relation between m and the coercive force (HcJ) in Example 5.
Figure 14:
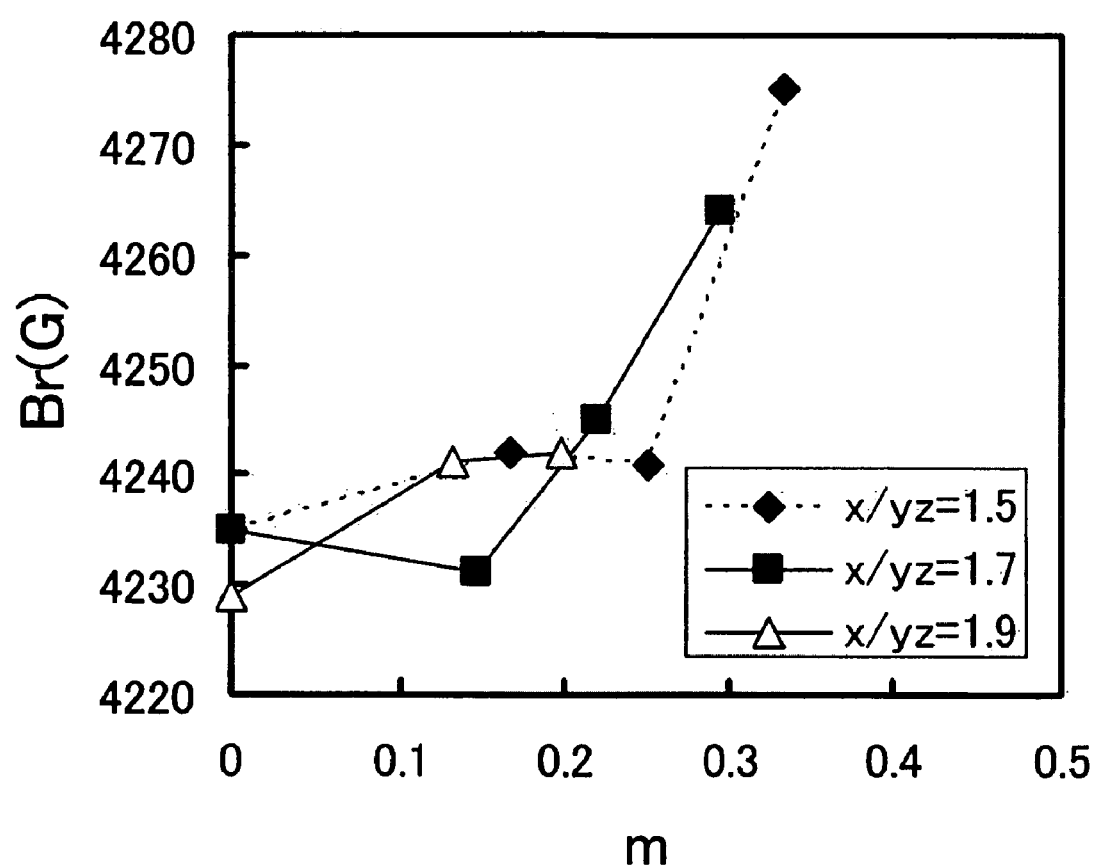
FIG. 14 is a graph which shows the relation between m and the residual magnetic flux density (Br) in Example 5.

As shown in FIG. 13 and FIG. 14, even if the value of x/yz was varied within the limits which the present invention recommends, the improvement effect in the magnetic properties by containing Pr has been confirmed.

EXAMPLE 6

The existence of the effect of containing Pr in the case of using Ba as an A element was confirmed in the Example 6.

Except for further having prepared barium carbonate ($BaCO_3$) as a starting material which constitutes the main components, weighed so that the main composition after sintering might be the following composition formula, a cylindrical sintered body was produced on the same conditions as in Example 1, and coercive force (HcJ) and residual magnetic flux density (Br) were measured in the same way as in Example 1. The results are shown in FIG. 15.

Composition formula: $A_{1-x}(La_{1-m}R_m)_x(Fe_{12-y}Co_y)_zO_{19}$ wherein
A=Sr, Ba;
R=Pr;
x=0.12, y=0.08, and z=1.00; and
m=0 and 0.33.

As shown in FIG. 15, when Ba was used as an A element, the effect of the improvement in the magnetic properties by containing Pr has been also confirmed. Moreover, it has been confirmed that the sintered body which contains Sr 100% exhibits higher magnetic properties than the sintered body which contains 50 atomic % of Sr and 50 atomic % of Ba.

EXAMPLE 7

The relation between m and the temperature dependency of coercive force (HcJ) was confirmed in Example 7. The cylindrical sintered body was produced on the same conditions as in Example 1 except for having weighed so that the main composition after sintering might be the following composition formula. The calcining temperature was 1100° C. and the sintering temperature was 1180° C.

Composition formula: $A_{1-x}(La_{1-m}R_m)_x(Fe_{12-y}Co_y)_zO_{19}$ wherein
A=Sr, R=Pr;
x=0.12, y=0.08, and z=1.00; and
m=0, 0.08 and 0.33.

Figure 17:
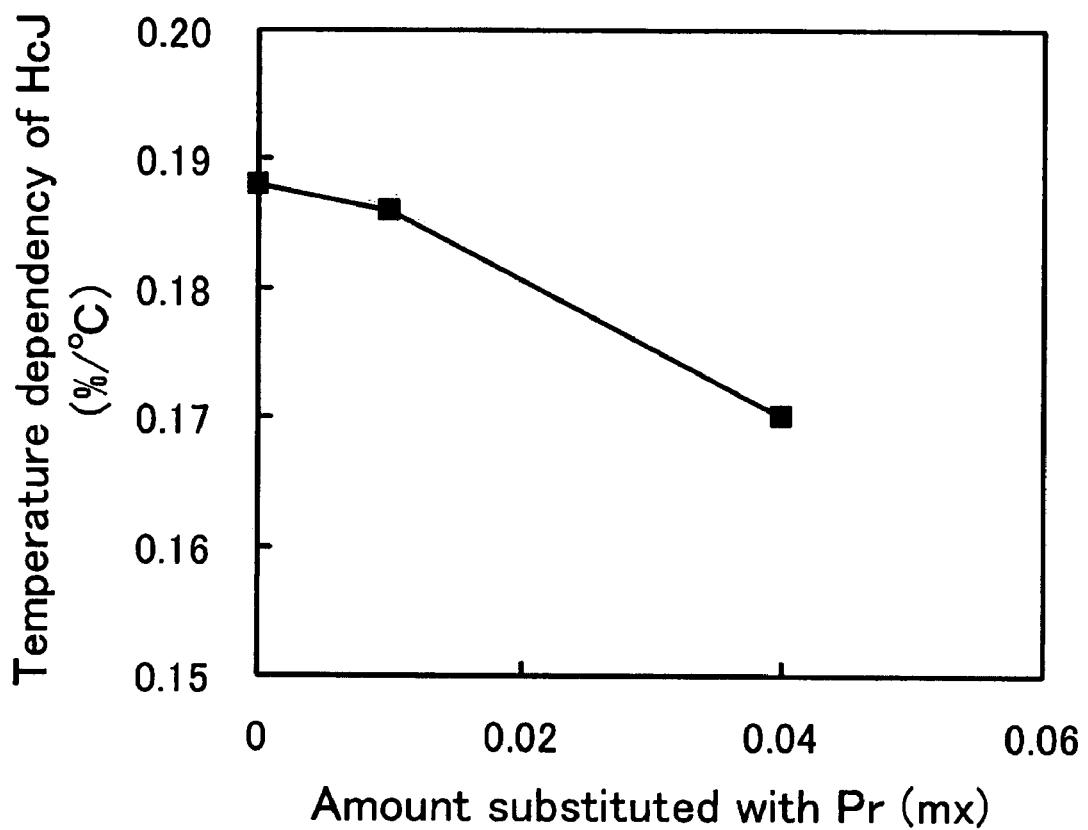
FIG. 17 is a graph which shows the relation between the amount substituted with Pr, and the temperature dependency of coercive force (HcJ)

I-H hysteresis curve of the temperature range from −80° C. to 160° C. was determined for the obtained sintered body with a vibrating sample magnetometer (VSM). The temperature dependency of coercive force (HcJ) was investigated from this I-H hysteresis curve. Using this result, the temperature coefficient of coercive force (HcJ) was computed by straight line approximation in the range from −40° C. to 120° C. The results are shown in FIG. 16. The relation between the amount of Pr substitution and the temperature dependency of coercive force (HcJ) is also shown in FIG. 17.

Here, the temperature coefficient ΔHcJ/HcJ/ΔT is a change rate to the coercive force. (HcJ) at 20° C. That is, ΔT and ΔHcJ/HcJ in FIG. 16 are as follows.

ΔT=120° C.−(−40° C.)=160° C.

ΔHcJ/HcJ={coercive force at 120° C.−(coercive force at −40° C.)}/coercive force at 20° C.

It has been confirmed that the temperature dependency of coercive force (HcJ) was improved as the amount of Pr substitution increased as shown in FIG. 17.

EXAMPLE 8

The relation between m and the magnetocrystalline anisotropy constant $K_1$ was confirmed in Example 8. Here, coercive force (HcJ) is the important magnet characteristic along with residual magnetic flux density (Br), and the coercive force (HcJ) is proportional to the product (HA×fc) of anisotropy field (HA (=$2K_1$/Is)) and single-domain particle ratio (fc). The magnetocrystalline anisotropy constant $K_1$ is a constant decided by the crystal structure of magnet, and influences the value of coercive force (HcJ). It is advantageous for obtaining high coercive force (HcJ) if the magnetocrystalline anisotropy constant $K_1$ can be increased.

The cylindrical sintered body was produced on the same conditions as in Example 1 except for having weighed so that the main composition after sintering might be the following composition formula. The calcining temperature was 1100° C. and the sintering temperature was 1180° C.

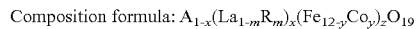

Composition formula: $A_{1-x}(La_{1-m}R_m)_x(Fe_{12-y}Co_y)_zO_{19}$ wherein

A=Sr, R=Pr;

x=0.12, y=0.08, and z=1.00; and m=0 and 0.33.

Figures 18, 19:
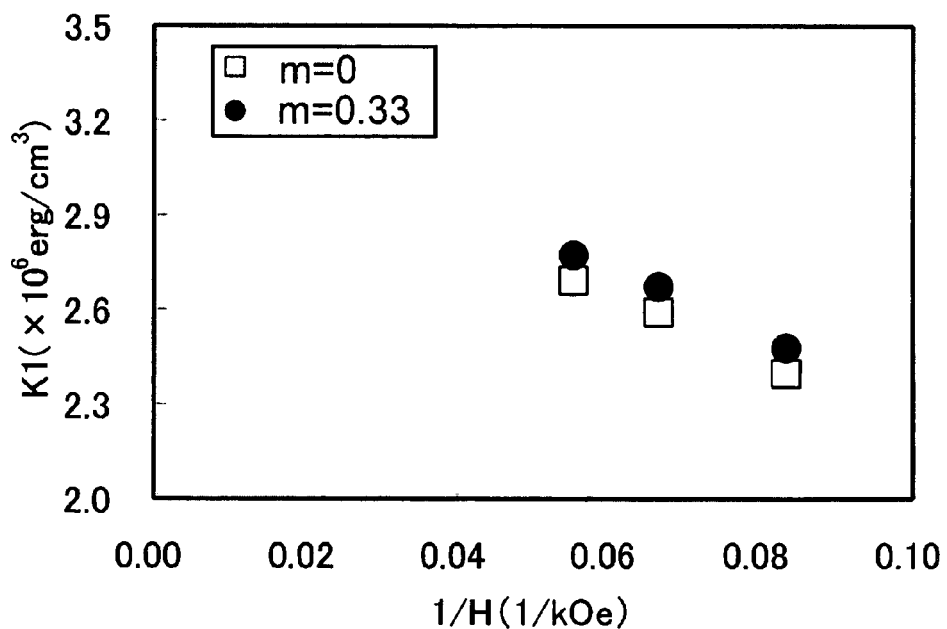
FIG. 18 is a table which shows the relation between the existence or non-existence of Pr content, and the magnetocrystalline anisotropy constant $K_1$.
FIG. 19 is a graph which shows the relation of the 1/H and the magnetocrystalline anisotropy constant $K_1$ in Example 8.

The magnetocrystalline anisotropy constant $K_1$ was determined for the obtained sintered body by torque measurement. The samples for the torque measurement were cut out from the sintered body in the shape of a disk in which the orientation direction is in the disk plane and they were used for the torque measurement. And after measuring a torque curve at room temperature in the range of applied magnetic field H of 12 to 20 kOe, the torque curve was subjected to Fourier transform, and the amplitude K of a two-fold symmetry constituent. The determined K was plotted against 1/H for which it asked, and the magnetocrystalline anisotropy constant $K_1$ was determined by extrapolating to 1/H=0. The results are shown in FIG. 18 and FIG. 19. The applied magnetic field was 1 to 1.6 MA/m and the temperature range was from 80K to 420K.

As shown in FIG. 18 and 19, the magnetocrystalline anisotropy constant $K_1$ has been improved by having Pr contained. In connection with this, coercive force (HcJ) at room temperature has been improved by 200 Oe as compared with the case where no Pr is contained.

EXAMPLE 9

The relation between the amount of $SiO_2$ addition and the magnetic properties was confirmed in Example 9.

Except for adjusting the additive amount of $CaCO_3$, the additive amount of $SiO_2$, and Ca/Si to the values in FIG. 20, a cylindrical sintered body was produced on the same conditions as in Example 1, and coercive force (HcJ) and residual magnetic flux density (Br) were measured in the same way as in Example 1. The results are shown in FIG. 20 to FIG. 26. The calcining temperature was 1100° C. and the sintering temperature was 1180° C.

As shown in FIG. 21 to FIG. 26, the same tendency was shown in both the cases of m=0 and m=0.33. Ca/Si is within the limits which the present invention recommends, and coercive force (HcJ) and/or the residual magnetic flux density (Br) have been improved when the additive amount of $SiO_2$ is 0.15 to 1.35.

Figure 21:
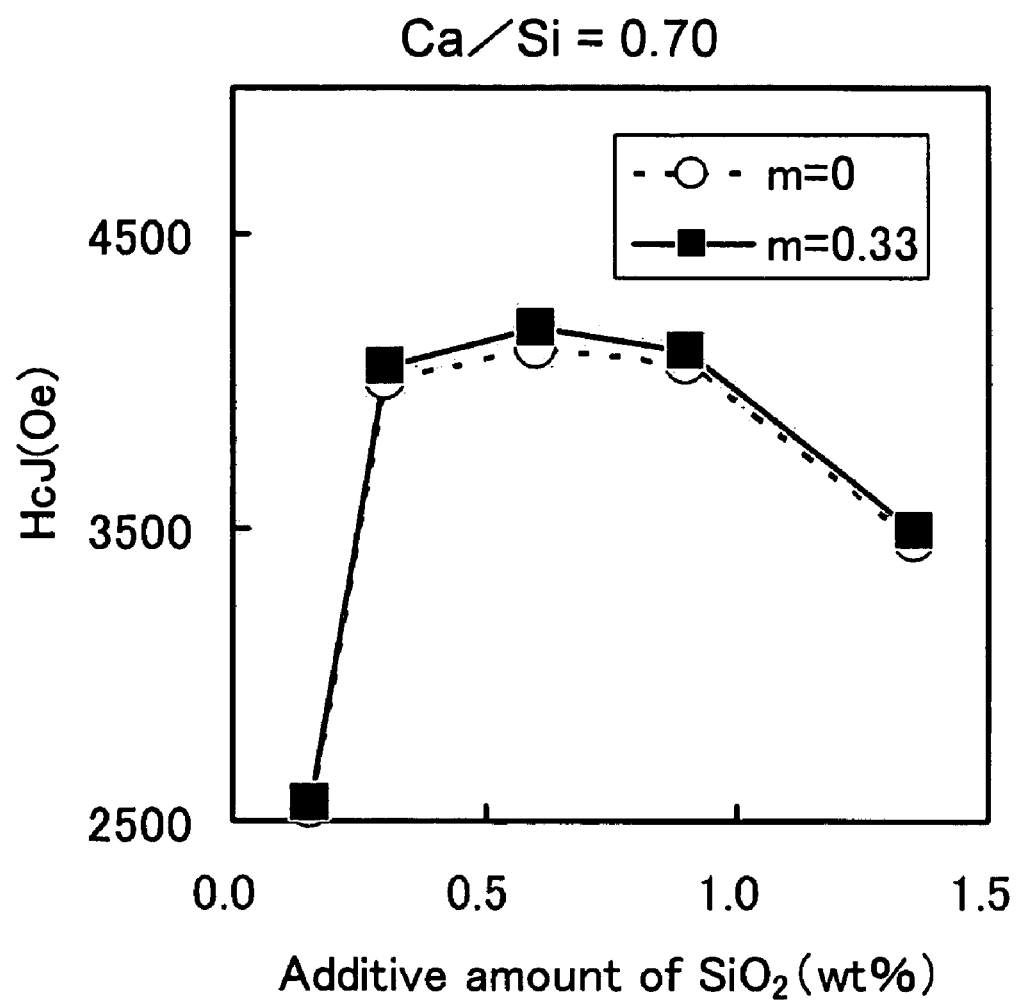
FIG. 21 is a graph which shows the relation of the additive amount of $SiO_2$ and the coercive force (HcJ) in the case of Ca/Si=0.70.
Figure 22:
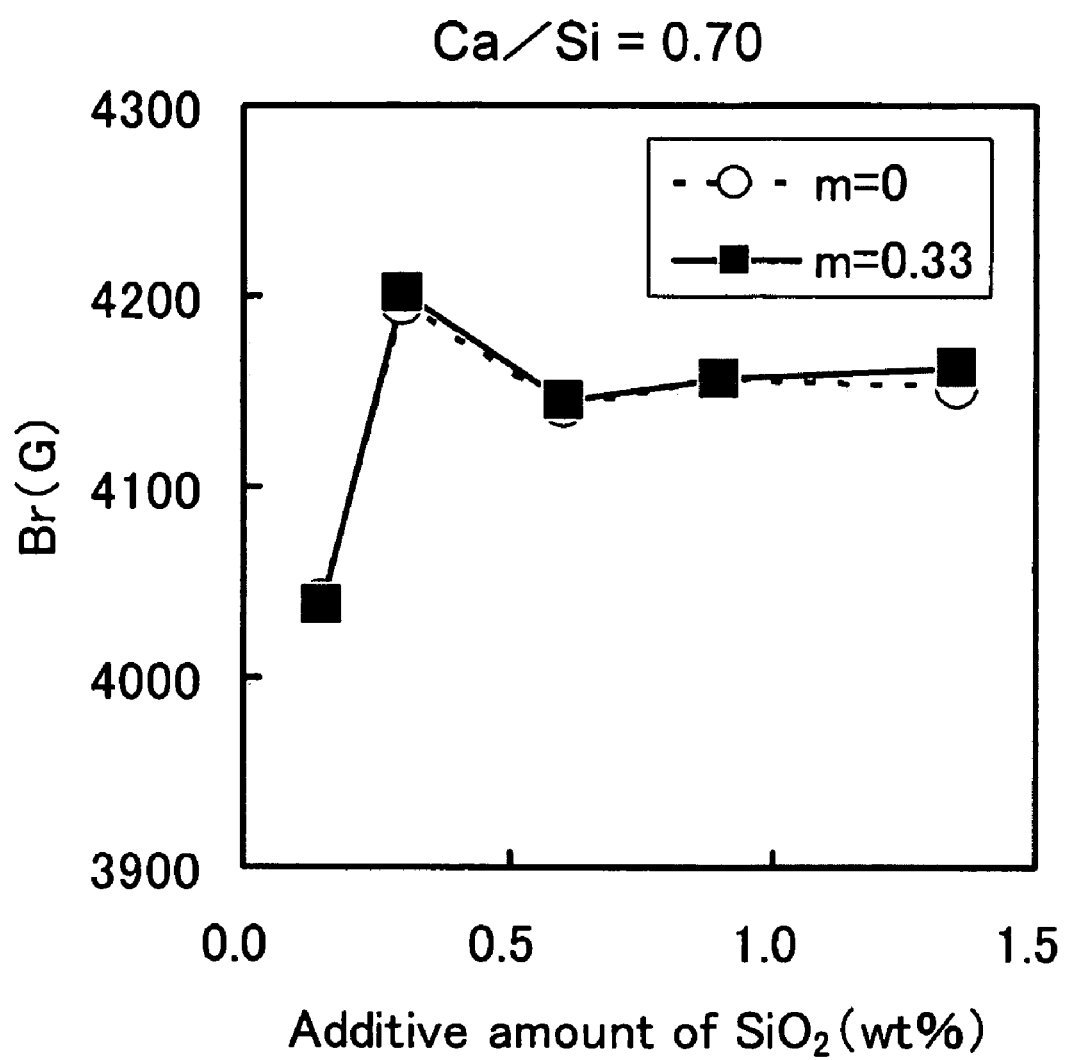
FIG. 22 is a graph which shows the relation of the additive amount of $SiO_2$ and the residual magnetic flux density (Br) in the case of Ca/Si=0.70.

As shown in FIG. 21 and FIG. 22, in the case of Ca/Si=0.70, coercive force (HcJ) of 4000 Oe or more, and the residual magnetic flux density beyond 4100 G (Br) was obtained when the additive amount of $SiO_2$ is 0.3 to 1.0.

Figure 23:
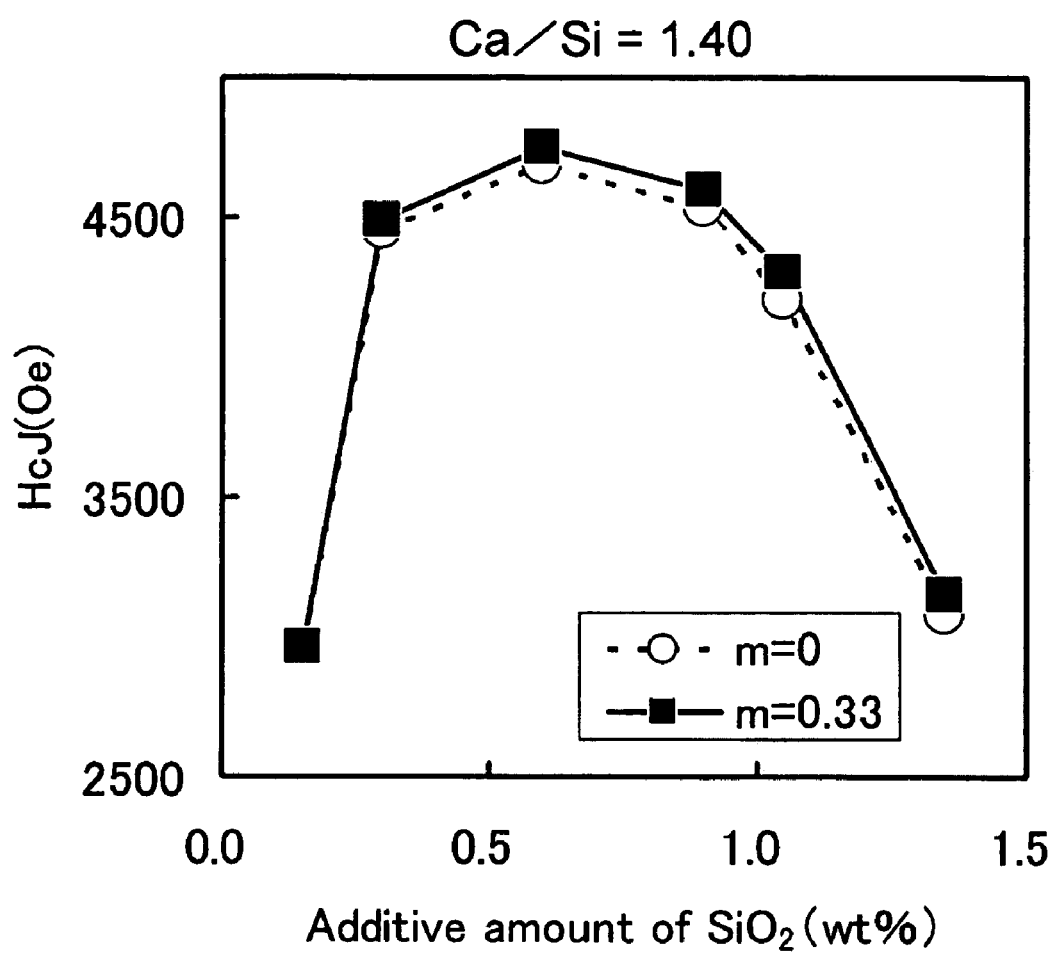
FIG. 23 is a graph which shows the relation of the additive amount of $SiO_2$ and the coercive force (HcJ) in the case of Ca/Si=1.40.
Figure 24:
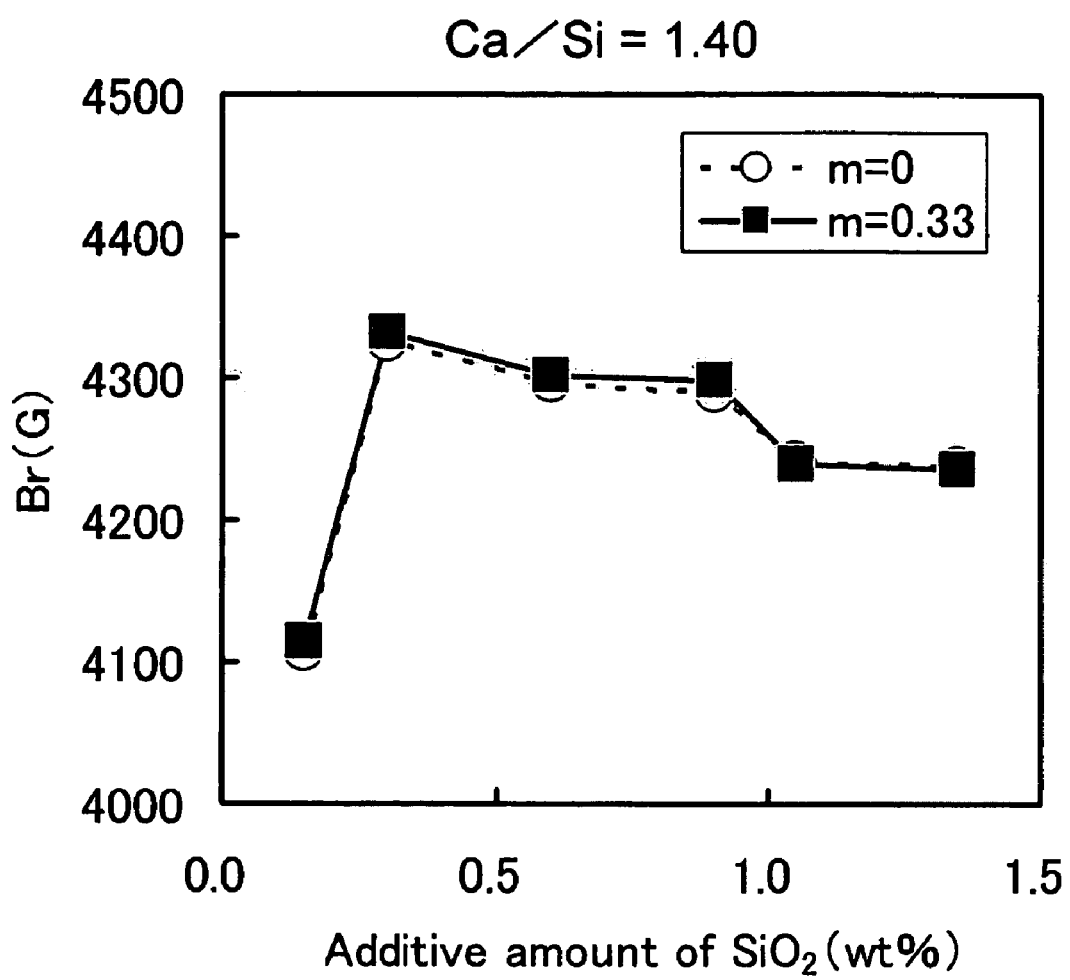
FIG. 24 is a graph which shows the relation of the additive amount of $SiO_2$ and the residual magnetic flux density (Br) in the case of Ca/Si=1.40.

As shown in FIG. 23 and FIG. 24, in the case of Ca/Si=1.40, coercive force (HcJ) of 4000 Oe. or more, and the residual magnetic flux density beyond 4200 G (Br) was able to be obtained when the additive amount of $SiO_2$ is 0.2 to 1.2.

Figure 25:
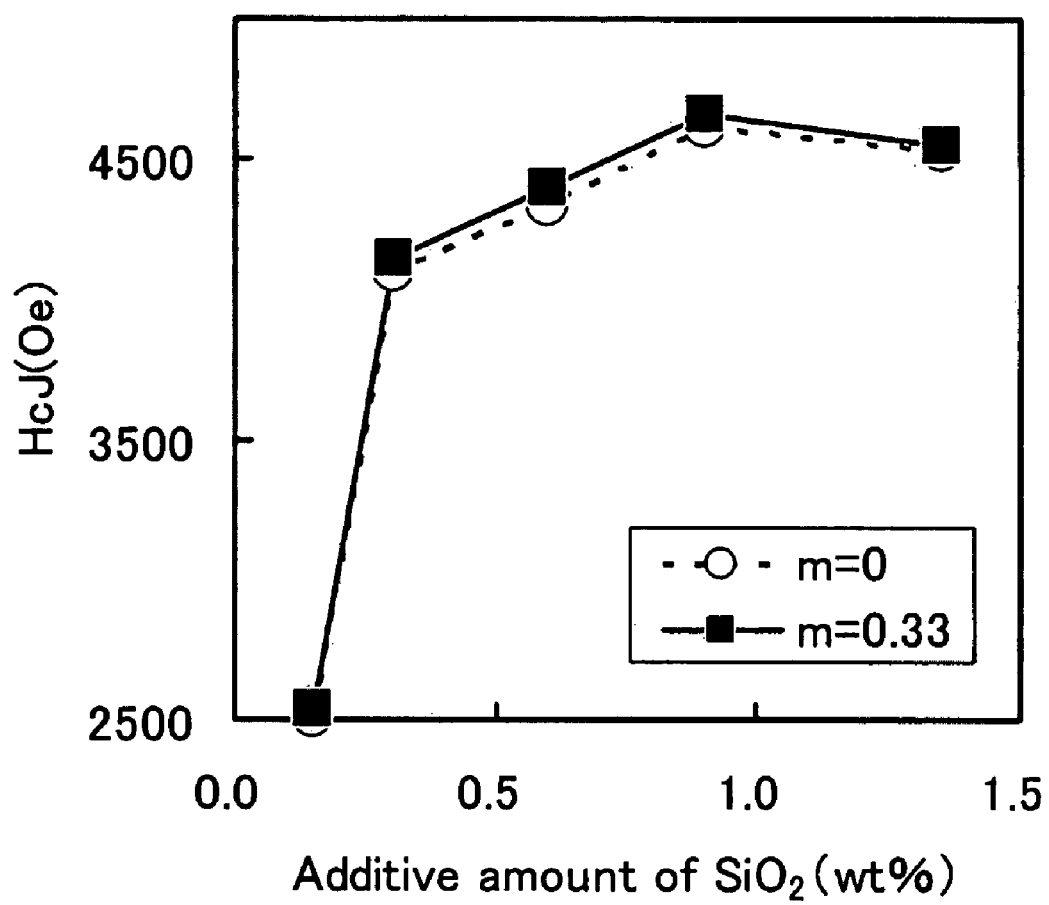
FIG. 25 is a graph which shows the relation of the additive amount of $SiO_2$ and the coercive force (HcJ) in the case of Ca/Si=1.75.
Figure 26:
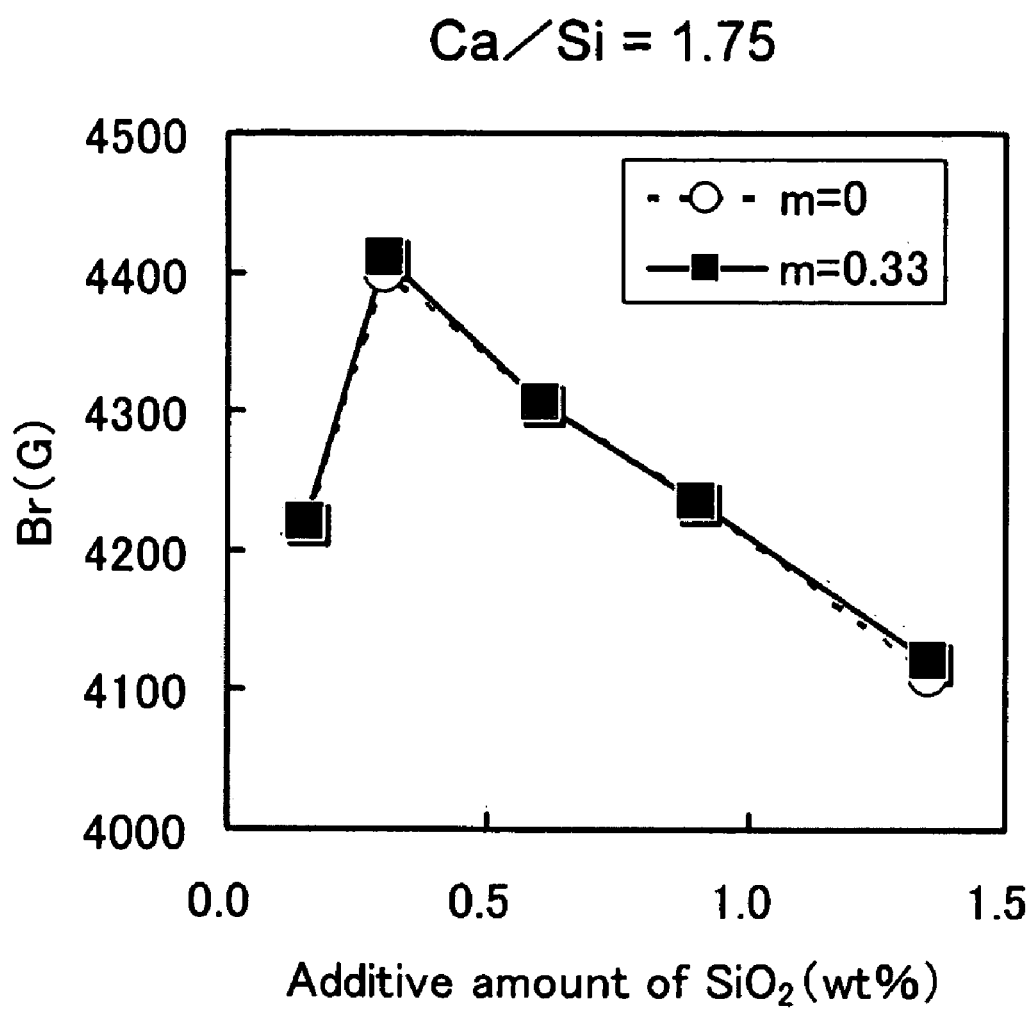
FIG. 26 is a graph which shows the relation of the additive amount of $SiO_2$ and the residual magnetic flux density (Br) in the case Ca/Si=1.75.
Figure 28:
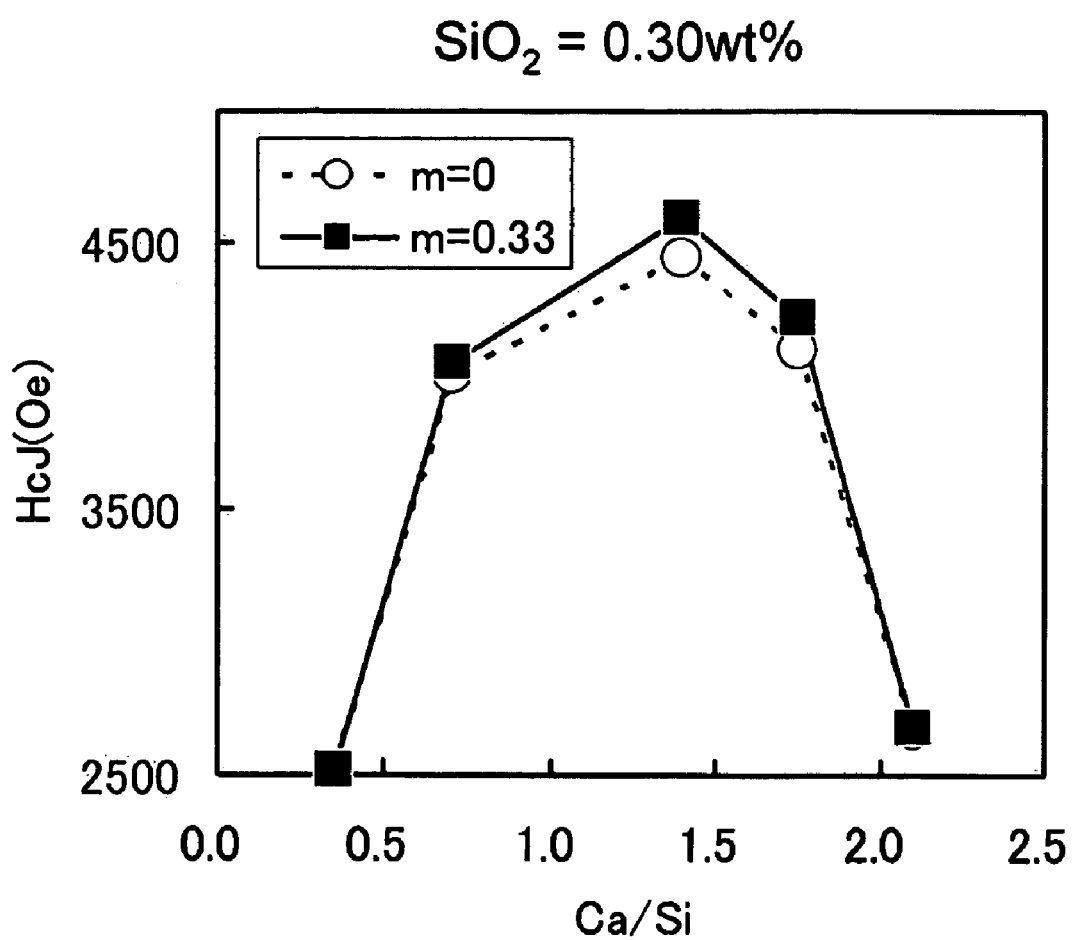
FIG. 28 is a graph which shows the relation of Ca/Si and the coercive force (HcJ) in the case where the additive amount of $SiO_2$ is 0.30 wt %.
Figure 29:
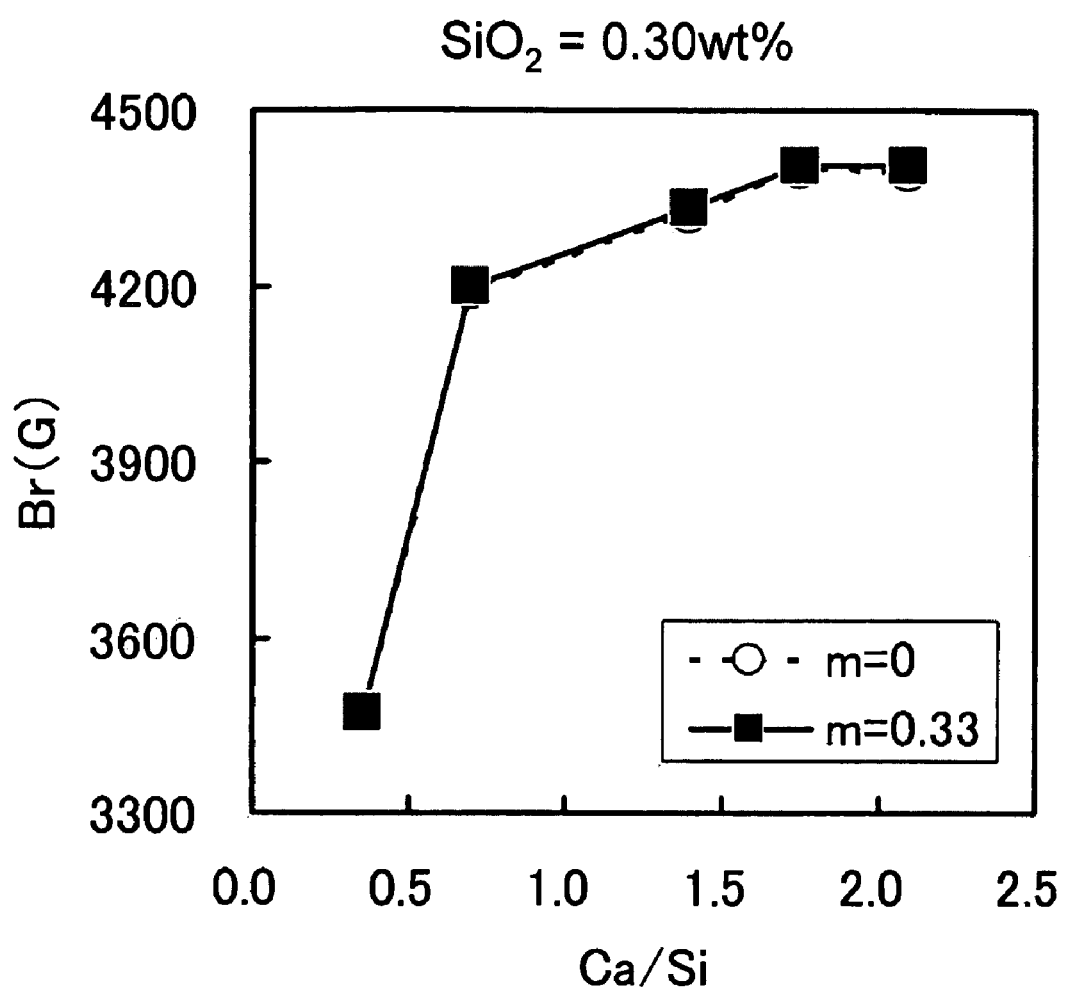
FIG. 29 is a graph which shows the relation of Ca/Si and the residual magnetic flux density (Br) in the case where the additive amount of $SiO_2$ is 0.30 wt %.
Figure 30:
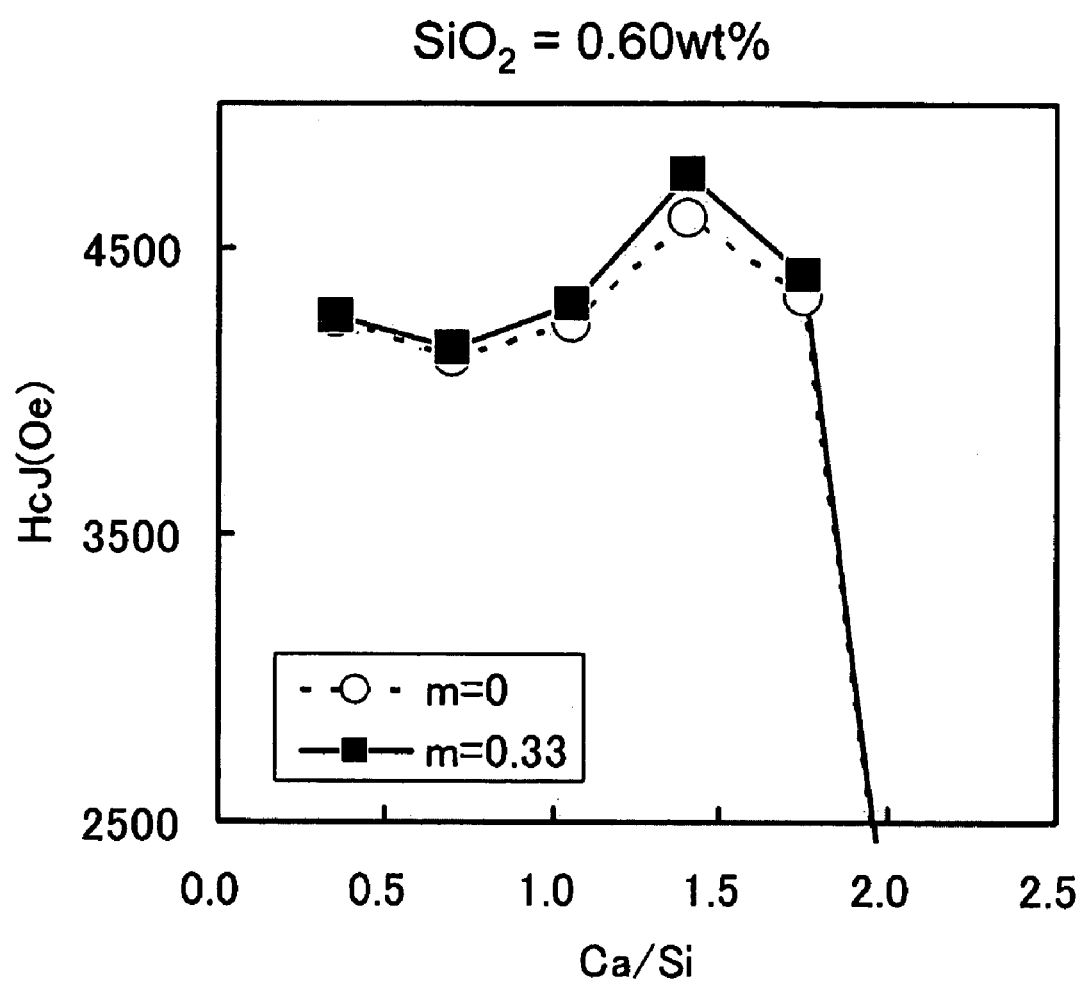
FIG. 30 is a graph which shows the relation of Ca/Si and the coercive force (HcJ) in the case where the additive amount of $SiO_2$ is 0.60 wt %.
Figure 31:
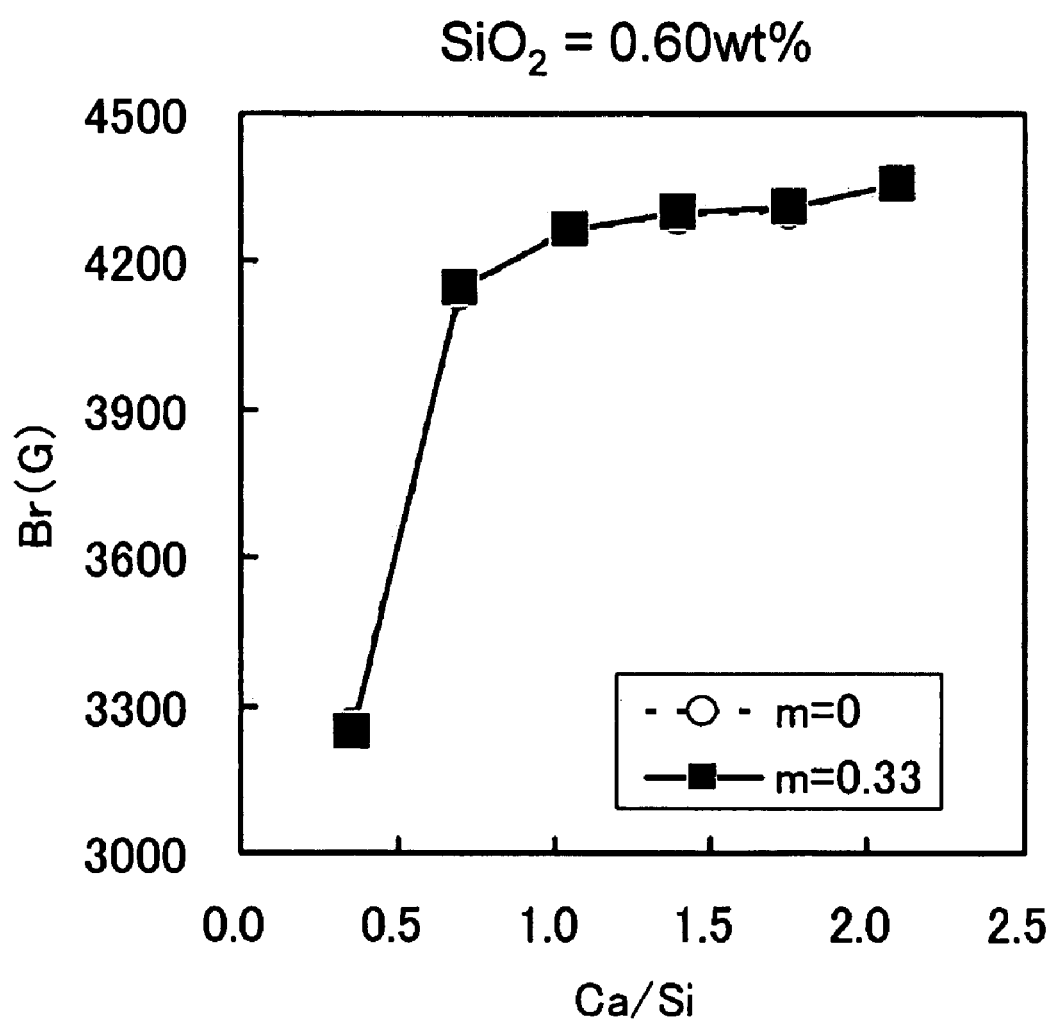
FIG. 31 is a graph which shows the relation of Ca/Si and the residual magnetic flux density (Br) in the case where the additive amount of $SiO_2$ is 0.60 wt %.
Figure 32:
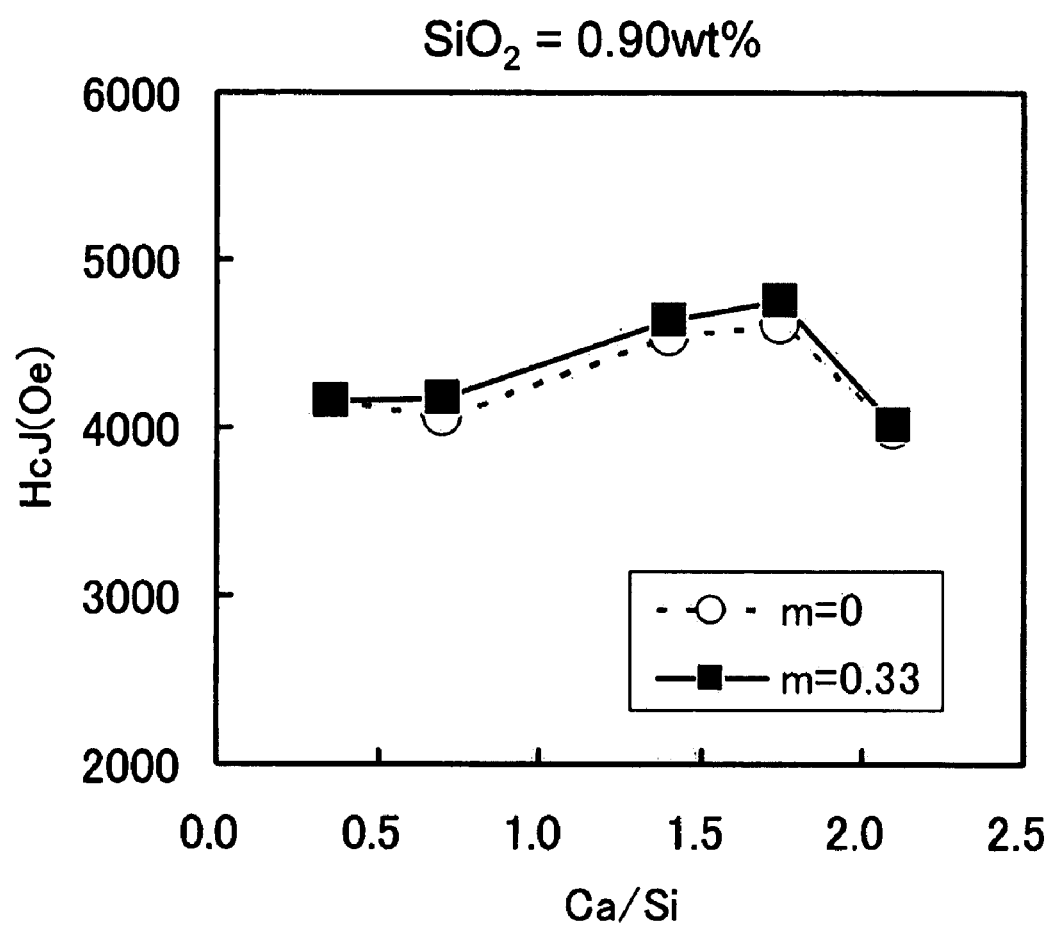
FIG. 32 is a graph which shows the relation of Ca/Si and the coercive force (HcJ) in the case where the additive amount of $SiO_2$ is 0.90 wt %.
Figure 33:
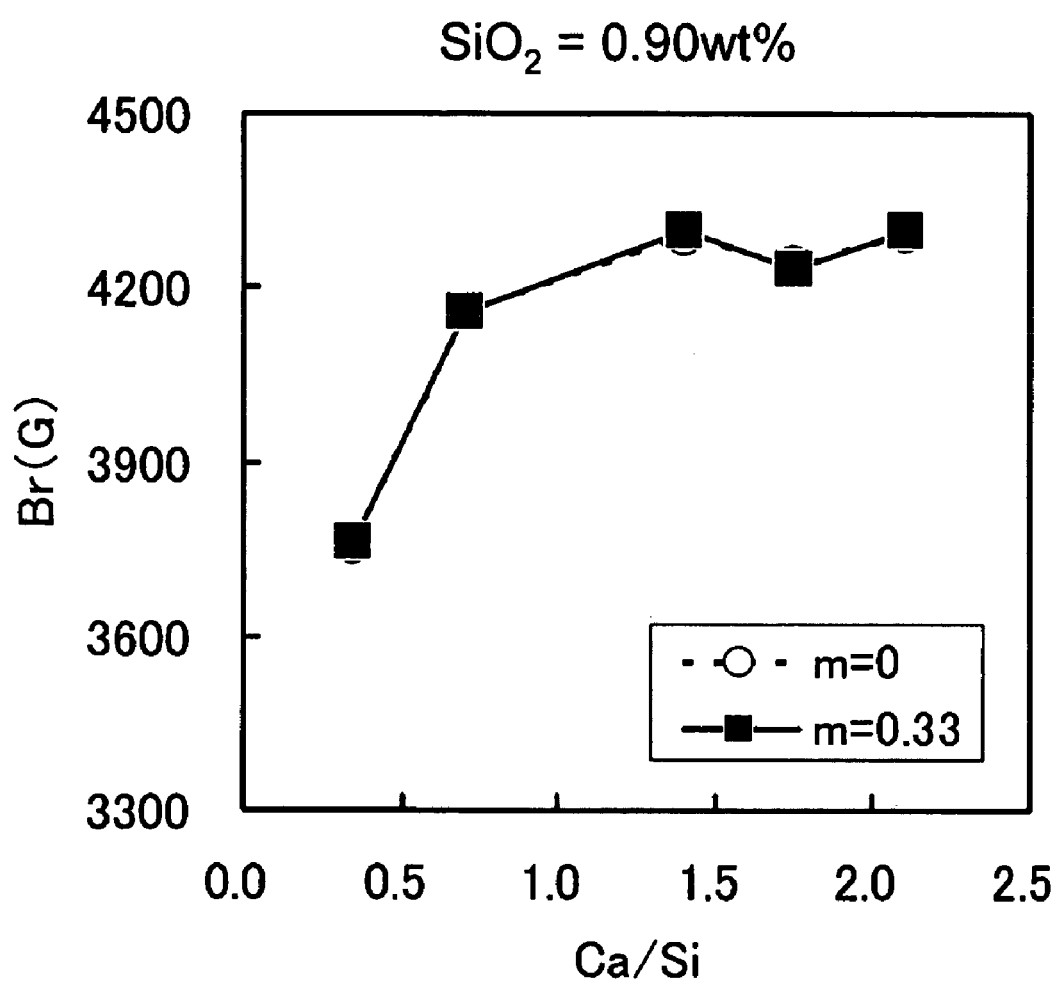
FIG. 33 is a graph which shows the relation of Ca/Si and the residual magnetic flux density (Br) in the case where the additive amount of $SiO_2$ is 0.90 wt %.

As shown in FIG. 25 and FIG. 26, in the case of Ca/Si=1.75, coercive force (HcJ) of 4000 Oe or more, and the residual magnetic flux density beyond 4200 G (Br) was able to be obtained when the additive amount of $SiO_2$ is 0.2 to 1.0.

EXAMPLE 10

The relation between Ca/Si and the magnetic properties was confirmed in the Example 10.

Except for adjusting the additive amount of $CaCO_3$, the additive amount of $SiO_2$, and Ca/Si to the values in FIG. 27, a cylindrical sintered body was produced on the same conditions as in Example 1, and coercive force (HcJ) and residual magnetic flux density (Br) were measured in the same way as in Example 1. The results are shown in FIG. 27 to FIG. 33. The calcining temperature was 1100° C. and the sintering temperature was 1180° C.

As shown in FIG. 27 to FIG. 33, in each case where the additive amount of $SiO_2$ is 0.30 wt %, 0.60 wt % and 0.90 wt %, when Ca/Si exceeded 2.10, coercive force (HcJ) greatly decreased. It was able to achieve coercive force (HcJ) of 4000 Oe or more and residual magnetic flux density beyond 4000 G (Br) at the time of 0.6≦Ca/Si≦1.8.

EXAMPLE 11

The relation between the timing for addition of element R and the magnetic properties was examined in Example 11.

Iron oxide ($Fe_2O_3$), strontium carbonate ($SrCO_3$), praseodymium oxide ($Pr_6O_{11}$), and lanthanum hydroxide (La(OH)$_3$) were prepared as starting materials. At this time, the case where praseodymium oxide and lanthanum hydroxide are added at the time of mixing is called pre-addition, and the case where they are added at the time of the milling which is mentioned later is called post-addition.

After weighing these starting materials of which the main components were composed so that the main components after sintering might be the following composition formula in each case of pre-addition and post-addition, silicon oxide ($SiO_2$) was added in an amount of 0.6 wt % to the main components.

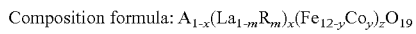

Composition formula: $A_{1-x}(La_{1-m}R_m)_x(Fe_{12-y}Co_y)_zO_{19}$ wherein

A=Sr, R=Pr;

x=0.12, y=0.08, and z=1.00; and m=0 and 0.33 x/yz=1.5.

These mixed materials were mixed and milled in a wet attritor for 2 hours. After the resulted mixed slurry was dried, it was calcined by maintaining it at 1150° C. in the atmosphere for 2 hours. The obtained calcined powders were pulverized for 17 minutes by a small rod vibration mill. After weighing and adding cobalt oxide ($Co_3O_4$) to the obtained pulverized powders, calcium carbonate ($CaCO_3$) and sorbitol were added so that the former might be 1.4wt % and the latter might be 0.5 wt % to the main composition after the above-mentioned sintering. In the case of post-addition in which addition was not performed at the time of mixing, praseodymium oxide and lanthanum hydroxide were further added so that it became the main composition after the above-mentioned sintering and silicon oxide ($SiO_2$) was added so that it might become 0.6 wt % to the main components. After that, the mixture was milled in a wet attritor for 2 hours. The solid part concentration of the resulted milled slurry was adjusted to 70 to 75%, a cylindrically compacted body with diameter of 30 mm×thickness of 15 mm was obtained in a magnetic field of 12 kOe applied using a wet magnetic field molding machine. The compacted body was fully dried at room temperature in the atmosphere, and subsequently calcined by holding it at 1180° C. to 1220° C. in the atmosphere for 1 hour. After processing the top and bottom sides of the obtained cylindrical sintered body, coercive force (HcJ) and residual magnetic flux density (Br) were measured using a B—H tracer having maximum application magnetic field of 25 kOe.

Figure 35:
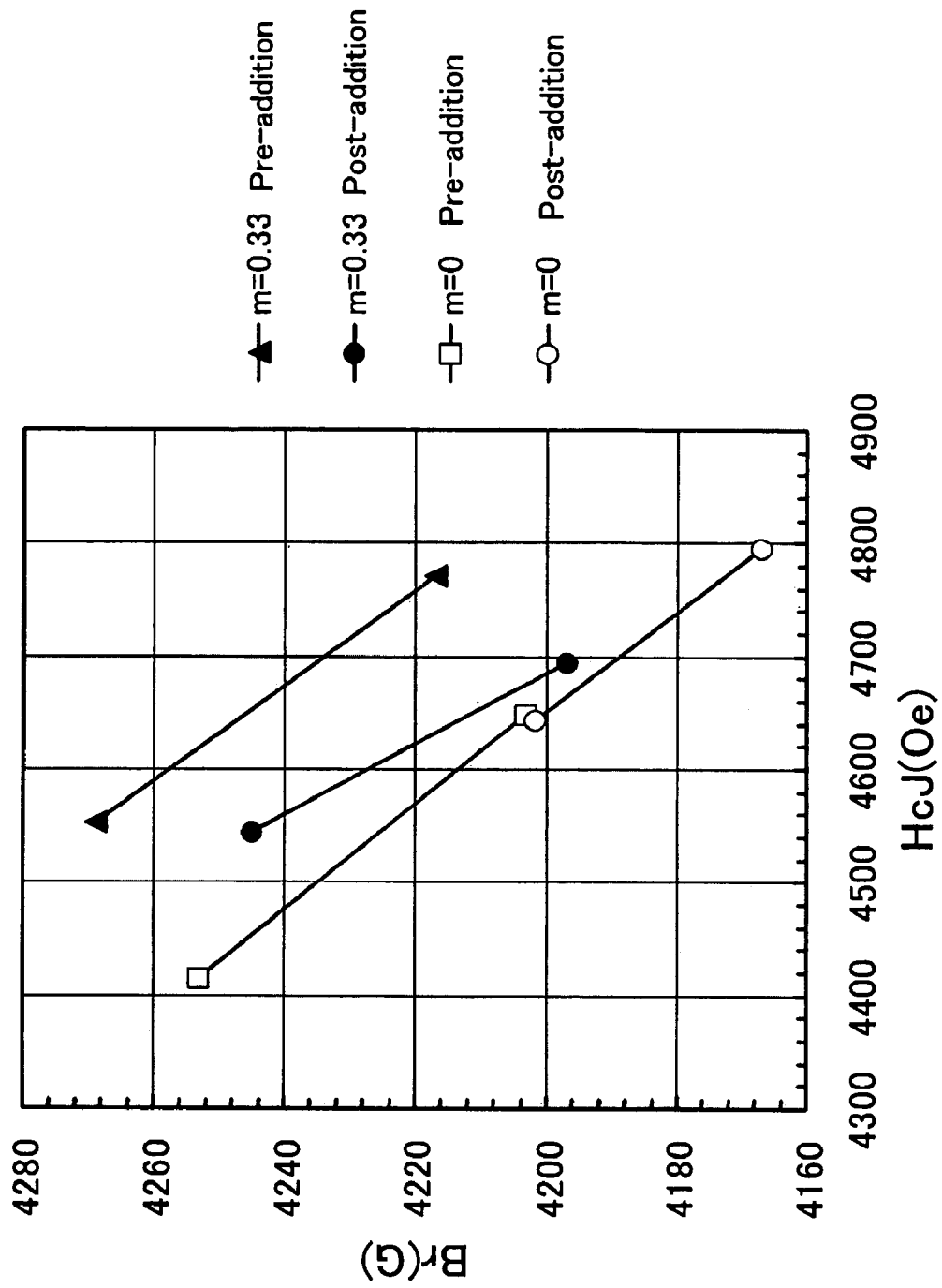
FIG. 35 is a graph which shows the magnetic properties in the case where Pr and La are pre-added and the magnetic properties in the case where Pr and La are post-added.

The results are shown in FIGS. 34 and 35. It has been confirmed that pre-addition of Pr was effective to obtain high residual magnetic flux density (Br) and high coercive force (HcJ) from FIG. 35.

EXAMPLE 12

The magnetic properties when Nd was used as an element R was confirmed in Example 12.

Iron oxide ($Fe_2O_3$), strontium carbonate ($SrCO_3$), neodymium oxide ($Nd_2O_3$) and lanthanum hydroxide ($La(OH)_3$) were prepared as starting materials. After weighing these starting materials of which the main components were composed so that the main components after sintering might be the following composition formula, silicon oxide ($SiO_2$) was added in an amount of 0.6 wt % to the main components.

Composition formula: $A_{1-x}(La_{1-m}R_m)_x(Fe_{12-y}Co_y)_zO_{19}$ wherein

A=Sr, R=Nd;

x=0.12, y=0.08, and z=1.00; and m=0 to 0.58.

Except for it, a cylindrical sintered body was produced on the same conditions as in Example 1, and coercive force (HcJ) and residual magnetic flux density (Br) were measured in the same way as in Example 1. The calcining temperature made 1150° C. and the sintering temperature was 1200° C. The results are shown in FIG. 36 to FIG. 38.

Figure 37:
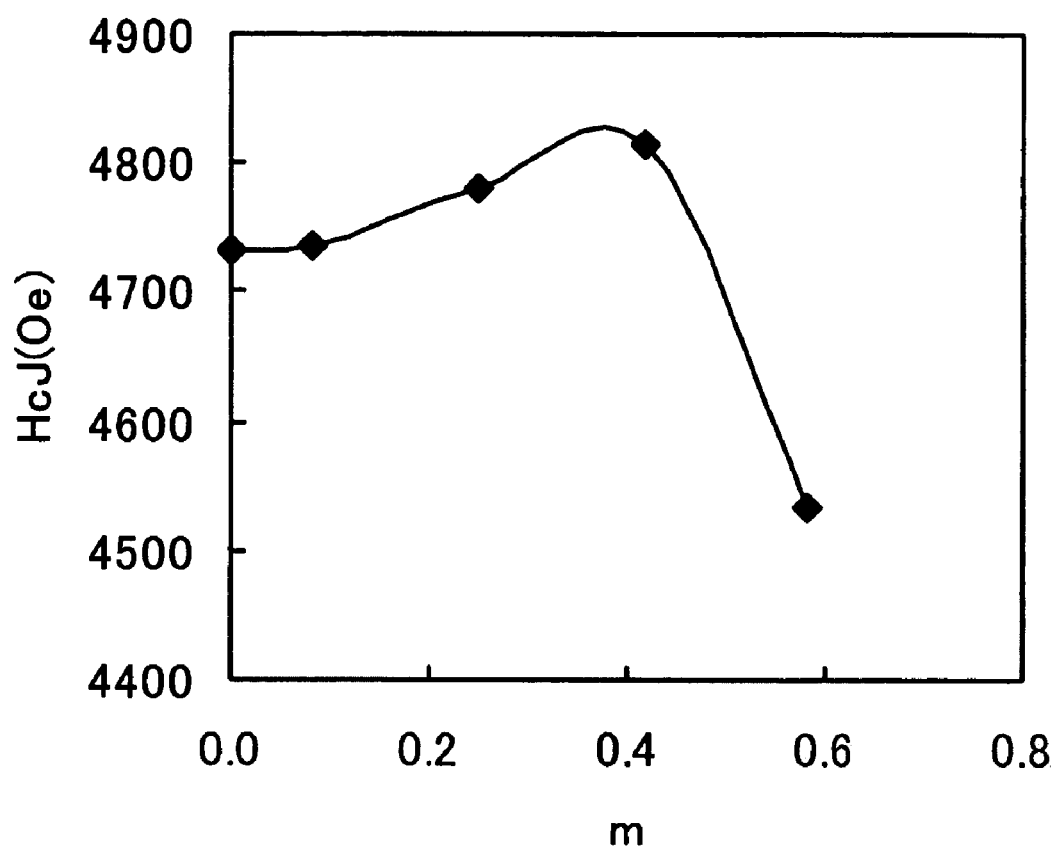
FIG. 37 is a graph which shows the relation between m and the coercive force (HcJ) in Example 12.
Figure 38:
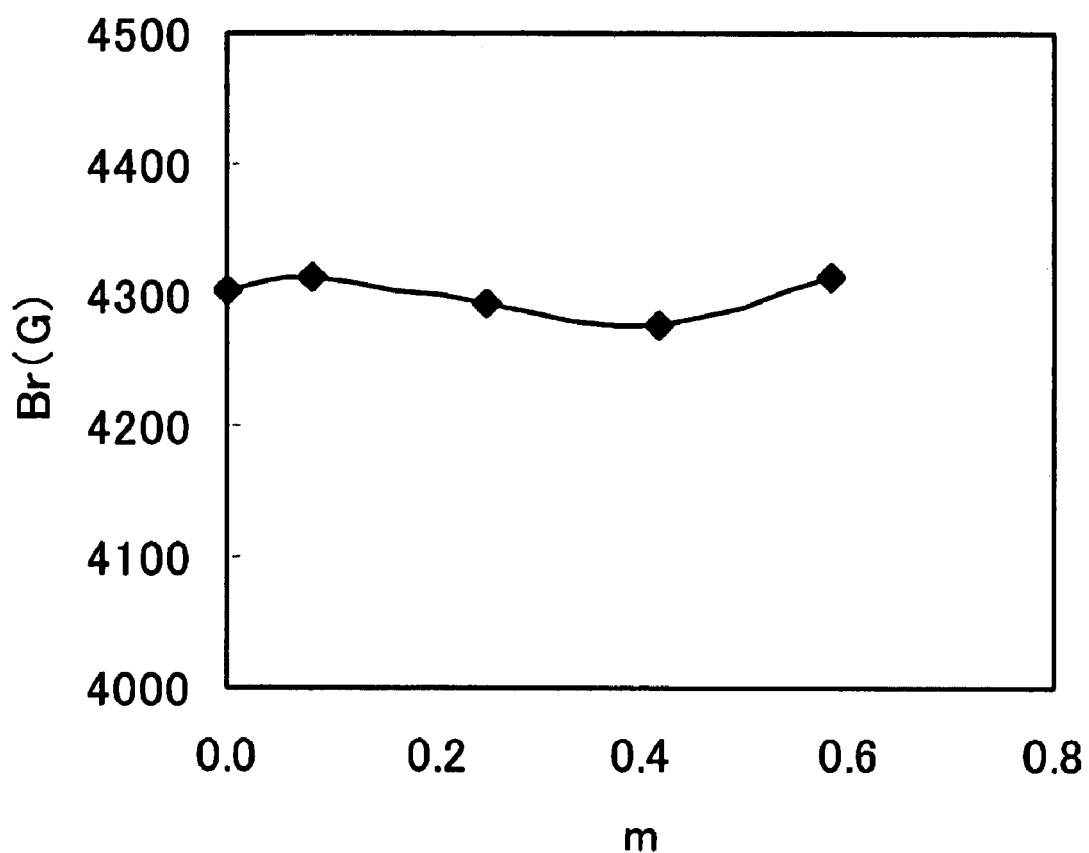
FIG. 38 is a graph which shows the relation between m and the residual magnetic flux density (Br) in Example 12.

It has been confirmed that coercive force (HcJ) would improve if m exceeds 0 also when Nd is used as an element R as shown in FIG. 37 and FIG. 38.

The analysis values (atomic %) of the sintered body produced in Examples 1, 2, 4, and 12 are shown in FIGS. 39 to 42, respectively. Although Mn is contained in each sintered body, this is mixed as impurities of Fe material. In addition, although Ba is also contained in each sintered body, this is mixed as impurities of Sr material.

From the result of the above Examples 1 to 12, it has been confirmed that coercive force (HcJ) is improved when m exceeded 0 in the composition containing R along with La. However, if m becomes large, the effect of this improvement in coercive force (HcJ) cannot be observed.

Further, it has been confirmed that when x/yz exceeds 1.0 in a composition containing R along with La, coercive force (HcJ) is improved.

Therefore, according to the present invention, ferrite magnetic materials having high magnetic properties can be provided by containing La and R.

EXAMPLE 13

The relation between the timing for addition of silicon constituent ($SiO_2$) and the magnetic properties was examined in Example 13.

Starting materials were weighed so that the main composition after sintering might be the following composition formula.

Composition formula: $A_{1-x}(La_{1-m}R_m)_x(Fe_{12-y}Co_y)_zO_{19}$ wherein

A=Sr, R=Pr;

x=0.12, y=0.08, and z=1.00; and m=0.33.

Figure 44:
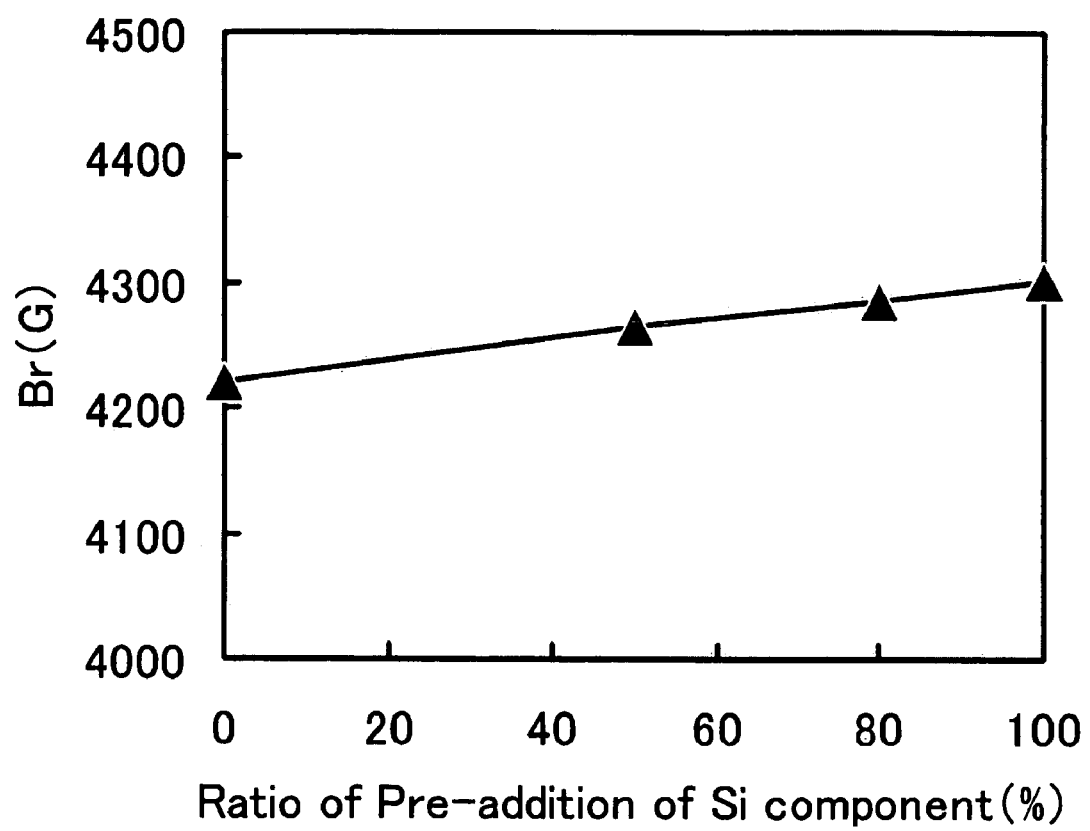
FIG. 44 is a graph which shows the relation between the ratio of the amount of pre-added $SiO_2$, and the residual magnetic flux density (Br)
Figure 45:
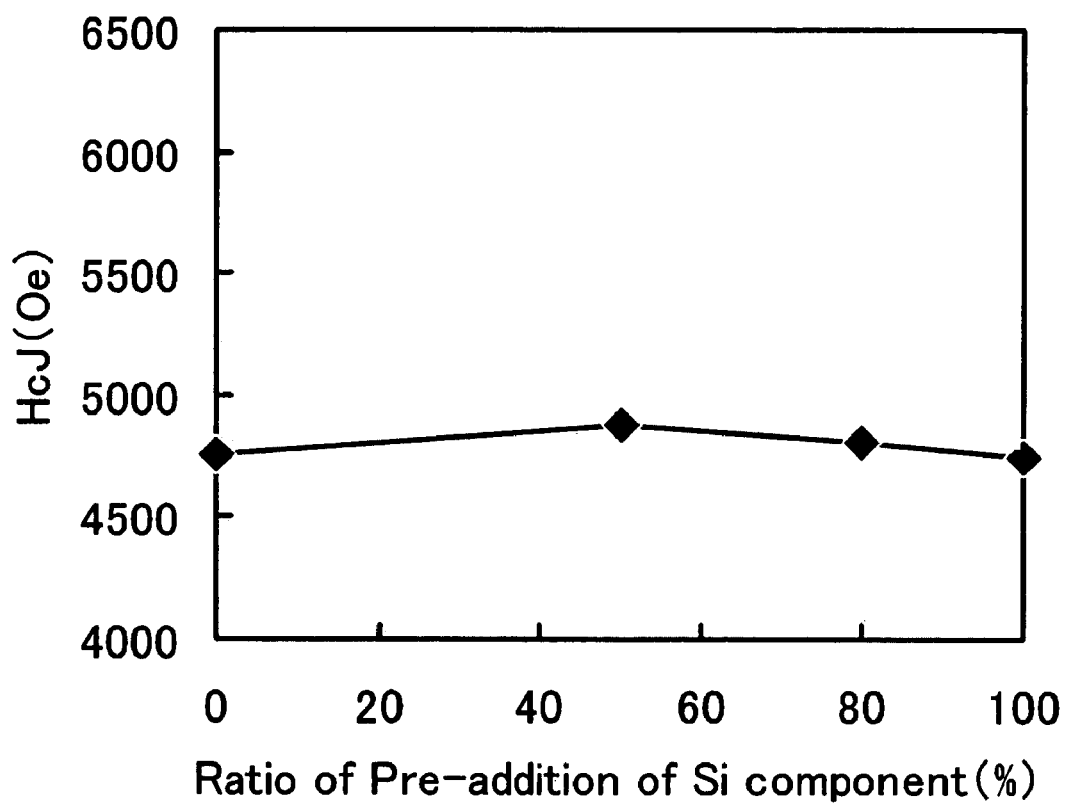
FIG. 45 is a graph which shows the relation between the ratio of the amount of pre-added $SiO_2$, and the coercive force (HcJ).

Except for having changed the addition timing of $SiO_2$, calcining temperature, and sintering temperature as shown in FIG. 43 while keeping the total amount of silicon oxide ($SiO_2$) at 0.6 wt %, sintered bodies were produced as in Example 1, and the same evaluation as in Example 1 was performed. The results are shown in FIG. 43 to FIG. 45. Here, post-addition of $SiO_2$ was performed after pulverizing.

As shown in FIG. 44, residual magnetic flux density (Br) has been improved as the ratio of the pre-addition amount of $SiO_2$ was increased, and when $SiO_2$ was added 100% in the pre-addition, the residual magnetic flux density (Br) has been improved by about 80 G compared with the case where 100% was in the post-addition. In addition, as shown in FIG. 45, pre-addition of $SiO_2$ does not have a bad influence on coercive force (HcJ). In order to enjoy the effect of the improvement in residual magnetic flux density (Br) by pre-addition of $SiO_2$, it is effective to add $SiO_2$ in an amount of 40% or more, further 50% or more and more preferably 80% or more.

What is claimed is:

1. A ferrite sintered magnet, comprising, as a main component, a composition represented by the composition formula:

$A_{1-x}(La_{1-m}R_m)_x(Fe_{12-y}Co_y)_zO_{19}$ wherein A is at least one element selected from Sr, Ba and Pb;

R is Pr and/or Nd; and $0.04 \leq x < 0.80$;

$0.02 \leq y < 0.20$;

$0.00 < m < 0.90$;

$0.90 < z < 1.10$; and $1.3 \leq x/yz < 2.5$.

2. The ferrite sintered magnet according to claim 1, wherein $0.01 \leq m \leq 0.70$ in the composition formula.

3. The ferrite sintered magnet according to claim 1, wherein $0.04 \leq m \leq 0.60$ in the composition formula.

4. The ferrite sintered magnet according to claim 1, wherein $0.04 \leq x \leq 0.45$ in the composition formula.

5. The ferrite sintered magnet according to claim 1, wherein $0.96 \leq z \leq 1.05$ in the composition formula.

6. The ferrite sintered magnet according to claim 1, wherein the A is Sr.

7. The ferrite sintered magnet according to claim 1, wherein the A is Sr and Ba.

8. The ferrite sintered magnet according to claim 1, wherein the R is Pr.

9. The ferrite sintered magnet according to claim 1, wherein the R is Nd.

10. The ferrite sintered magnet according to claim 1, comprising a Si component in an amount of 0.15 to 1.35 wt % in terms of $SiO_2$ based on the main component and a Ca component that allows the molar ratio Ca/Si of the Ca component to the Si component to be 0.35 to 2.10.

11. The ferrite sintered magnet according to claim 1, wherein the ferrite sintered magnet has a coercive force of 4000 Oe or more and a residual magnetic flux density Br of 4000 G or more.

12. The ferrite sintered magnet according to claim 1, wherein the ferrite sintered magnet has a coercive force of 4500 Oe or more and a residual magnetic flux density Br of 4200 G or more.

13. The ferrite sintered magnet according to claim 1, wherein the following conditions are satisfied:
$0.04 \leq x \leq 0.45$;
$0.02 \leq y \leq 0.20$;
$0.01 \leq m \leq 0.70$;
$0.96 \leq z \leq 1.05$; and
$1.3 \leq x/yz \leq 2.5$.

14. The ferrite sintered magnet according to claim 13, wherein the following condition is satisfied:
$1.3 \leq x/yz \leq 2.3$.

15. The ferrite sintered magnet according to claim 1, comprising a Si component in an amount of 0.30 to 0.90 wt % in terms of $SiO_2$ based on the component and a Ca component that allows the molar ratio Ca/Si of the Ca component to the Si component to be 0.70 to 1.75.

* * * * *